US006723773B2

(12) United States Patent
Williams et al.

(10) Patent No.: US 6,723,773 B2
(45) Date of Patent: Apr. 20, 2004

(54) POLYMERIC COMPOSITION AND PRINTER/COPIER TRANSFER SHEET CONTAINING THE COMPOSITION

(75) Inventors: Scott Williams, Hawley, PA (US); Heather Penk, Santa Maria, CA (US); Heather Reid, Hamburg, NJ (US)

(73) Assignee: Foto-Wear, Inc., Milford, PA (US)

( * ) Notice: Subject to any disclaimer, the term of this patent is extended or adjusted under 35 U.S.C. 154(b) by 0 days.

(21) Appl. No.: 09/950,591

(22) Filed: Sep. 13, 2001

(65) Prior Publication Data

US 2002/0058194 A1 May 16, 2002

Related U.S. Application Data

(62) Division of application No. 09/541,083, filed on Mar. 31, 2000.
(60) Provisional application No. 60/127,625, filed on Apr. 1, 1999.

(51) Int. Cl.[7] .......................... C08K 5/06; C08K 5/053; C08L 75/04

(52) U.S. Cl. ....................... 524/378; 524/386; 524/591; 524/804

(58) Field of Search .......................... 524/62, 378, 591, 524/804; 428/195, 200

(56) References Cited

U.S. PATENT DOCUMENTS

| | | | |
|---|---|---|---|
| 3,222,419 A | 12/1965 | Jubilee et al. | |
| 3,257,478 A | 6/1966 | Jubilee et al. | |
| 3,658,570 A | 4/1972 | Crooks et al. | |
| 3,936,542 A | 2/1976 | Cox | |
| 4,021,591 A | 5/1977 | DeVries et al. | |
| 4,189,395 A | 2/1980 | Bland | |
| 4,235,657 A | 11/1980 | Greenman et al. | |
| 4,284,456 A | 8/1981 | Hare | |
| 4,322,467 A | 3/1982 | Heimbach et al. | |
| 4,337,289 A | 6/1982 | Reed et al. | |
| 4,351,871 A | 9/1982 | Lewis et al. | |
| 4,477,622 A | 10/1984 | Sanderson et al. | |
| 4,555,436 A | 11/1985 | Geurtsen et al. | |
| 4,726,979 A | 2/1988 | Chapman | |
| 4,773,953 A | 9/1988 | Hare | |
| 4,863,781 A | 9/1989 | Kronzer | |
| 4,869,957 A | 9/1989 | Vankerckhoven et al. | |
| 4,966,815 A | 10/1990 | Hare | |
| 4,980,224 A | 12/1990 | Hare | |
| 5,019,475 A | 5/1991 | Higashiyama et al. | |
| 5,104,719 A | 4/1992 | Kamen et al. | |
| 5,139,917 A | 8/1992 | Hare | |
| 5,163,247 A | 11/1992 | Weber et al. | |
| 5,236,801 A | 8/1993 | Hare | |
| 5,242,739 A | 9/1993 | Kronzer et al. | |
| 5,242,781 A | 9/1993 | Ohbayashi et al. | |
| 5,271,990 A | 12/1993 | Kronzer et al. | |
| 5,366,837 A | 11/1994 | Sakai | |
| 5,370,132 A | 12/1994 | Weber et al. | |
| 5,441,056 A | 8/1995 | Weber et al. | |
| 5,501,902 A | 3/1996 | Kronzer | |
| 5,603,996 A | 2/1997 | Overcash et al. | |
| 5,612,168 A | 3/1997 | Ishikawa | |
| 5,620,548 A | 4/1997 | Hare | |
| 5,665,479 A | 9/1997 | Oez | |
| 5,678,247 A | 10/1997 | Vickers | |
| 5,741,387 A | 4/1998 | Coleman | |
| 5,759,738 A | 6/1998 | Tsuno et al. | |
| 5,798,179 A | 8/1998 | Kronzer | |
| 5,882,388 A | 3/1999 | Adair et al. | |
| 5,925,712 A | 7/1999 | Kronzer | |
| 5,948,586 A | 9/1999 | Hare | |
| 6,033,824 A | 3/2000 | Hare et al. | |
| 6,228,543 B1 | 5/2001 | Mizuno et al. | |
| 6,358,660 B1 * | 3/2002 | Agler et al. | 430/126 |

FOREIGN PATENT DOCUMENTS

| | | |
|---|---|---|
| DE | 4432383 C | 11/1995 |
| EP | 0728801 A2 | 8/1996 |
| EP | 0820874 A | 1/1998 |
| EP | 0842787 | 5/1998 |
| FR | 2442721 | 6/1980 |
| GB | 2202641 A | 9/1988 |
| WO | WO 9321561 | 10/1993 |
| WO | WO 9718090 A | 5/1997 |
| WO | WO 9820393 A | 5/1998 |
| WO | WO 9821398 A | 5/1998 |

OTHER PUBLICATIONS

English Abstract of JP 8324106 (Dec. 10, 1996).
English Abstract of JP 2147291 (Jun. 6, 1990).
Patent Abstracts of Japan; vol. 009, No. 078 (C–274), Apr. 6, 1995 & JP 59 210978 A (Dainippon Ink Kagaku Kogyo KK), 39 Nov. 1984 (Nov. 29, 1984) abstract.
Patent Abstracts of Japan; vol. 005, No. 005 (P–044), Jan. 14, 1981 & JP 55 135853 A (Fuji Xerox CO LTD), Oct. 23, 1980 abstract.
Patent Abstracts of Japan; vol. 1998, No. 01, Jan. 30, 1998 & JP 09 248974 A (OJI Paper CO LTD), 22 Sep. 11, 1997 (Sep. 22, 1997) abstract.

* cited by examiner

*Primary Examiner*—Tae H. Yoon
(74) *Attorney, Agent, or Firm*—Birch, Stewart, Kolasch & Birch, LLP

(57) ABSTRACT

A coated transfer sheet comprising a substrate having a first and second surface; optionally at least one barrier layer overlaying said first surface, at least one release layer overlaying said at least one barrier layer or, when the barrier layer is not present, said first surface of the substrate; and an optional image receiving layer comprising an ethylene acrylic acid co-polymer dispersion; wherein the coated transfer sheet exhibits cold peel and hot peel properties when transferred, and may be used in electrostatic printers and copiers or other devices in which toner particles are imagewise applied to a substrate. The addition of elastomeric polymers and polyurethanes help provide enhanced wash stability and chemical stability.

22 Claims, 2 Drawing Sheets

POLYMERIC COMPOSITION AND PRINTER/COPIER TRANSFER SHEET CONTAINING THE COMPOSITION

This application is a divisional of co-pending application Ser. No. 09/541,083, filed on Mar. 31, 2000, the entire contents of which are hereby incorporated by reference and for which priority is claimed under 35 U.S.C. §120; and this application claims priority of application Ser. No. 60/127,625 filed in United States on Apr. 1, 1999 under 35 U.S.C. §119.

The contents of U.S. Provisional Application No. 60/127,625 filed on Apr. 1, 1999, on which the present application is based and benefit is claimed under 35 U.S.C. 119(e) is herein incorporated by reference.

BACKGROUND OF THE INVENTION

1. Field of the Invention

The present invention relates to a polymeric composition per se and to a transfer sheet comprising said polymeric composition. Further, the present invention relates to a method of transferring image areas and non-image areas to a receptor element. More specifically, the present invention relates to an image transfer paper which can be used in electrostatic printers and copiers or other devices in which toner particles are imagewise applied to a substrate, and having images which are capable of being directly transferred to, for instance, a receiver such as a textile, such as a shirt or the like.

2. Description of the Prior Art

Textiles such as shirts (e.g., tee shirts) having a variety of designs thereon have become very popular in recent years. Many shirts are sold with pre-printed designs to suit the tastes of consumers. In addition, many customized tee shirt stores are now in the business of permitting customers to select designs or decals of their choice. Processes have also been proposed which permit customers to create their own designs on transfer sheets for application to tee shirts by use of a conventional hand iron, such as described in U.S. Pat. No. 4,244,358 issued Sep. 23, 1980. Furthermore, U.S. Pat. No. 4,773,953 issued Sep. 27, 1988, is directed to a method for utilizing a personal computer, a video camera or the like to create graphics, images, or creative designs on a fabric.

U.S. Pat. No. 5,620,548 is directed to a silver halide photographic transfer element and to a method for transferring an image from the transfer element to a receptor surface. Provisional application No. 60/029,917 discloses that the silver halide light sensitive grains be dispersed within a carrier that functions as a transfer layer, and does not have a separate transfer layer. Provisional application No. 60/056,446 discloses that the silver halide transfer element has a separate transfer layer. Provisional Application No. 60/0156,593 relates to dye sublimation thermal transfer paper and transfer method. Provisional Application No. 60/065,806 relates to a transfer element using CYCOLOR technology, and has a separate transfer layer. Provisional Application No. 60/065,804 relates to a transfer element using thermo-autochrome technology, and has a separate transfer layer. Provisional Application No. 60/030,933 relates to a transfer element using CYCOLOR and thermo-autochrome technology, but having no separate transfer layer.

U.S. Pat. No. 5,798,179 is directed to a printable heat transfer material using a thermoplastic polymer such as a hard acrylic polymer or poly (vinyl acetate) as a barrier layer, and has a separate film-forming binder layer.

U.S. Pat. No. 5,271,990 relates to an image-receptive heat transfer paper which includes an image-receptive melt-transfer film layer comprising a thermoplastic polymer overlaying the top surface of a base sheet.

U.S. Pat. No. 5,502,902 relates to a printable material comprising a thermoplastic polymer and a film-forming binder.

U.S. Pat. No. 5,614,345 relates to a paper for thermal image transfer to flat porous surfaces, which contains an ethylene copolymer or a ethylene copolymer mixture and a dye-receiving layer.

One problem with many known transfer sheets is that when conventional transfer materials travel through laser printers or copiers, the high temperature in the printers and copiers partially melts some polymer materials, such as a wax, present in the transfer material. As a result, the laser printer or copier must be frequently cleaned. The present invention solves this problem in the art. However, the present invention is not limited to use in laser printers and copiers.

Therefore, in order to attract the interest of consumer groups that are already captivated by the tee shirt rage described above, the present inventors provide, in one embodiment of the invention, the capability of transferring images directly to a receiver element using a material capable of holding and transferring an image. A unique advantage of the above described embodiment is to enable all consumers to wear and display apparel carrying designs that were formed on the substrate of the present invention by, for example, a photocopier or a computer printer in a timely and cost efficient means.

SUMMARY OF THE INVENTION

The present invention relates to a polymeric composition comprising an acrylic dispersion, an elastomeric emulsion, a plasticizer, and a water repellant. In one embodiment of the polymeric composition of the present invention, the acrylic dispersion is an ethylene acrylic acid dispersion, the plasticizer is a polyethylene glycol, and the water repellant is polyurethane dispersion. The ethylene acrylic acid preferably melts in the range of from 65° C. to about 180° C. The elastomeric emulsion and the polyurethane dispersion have a in the range of from about −50° C. to about 25° C.

The elastomeric emulsion may be selected from, for example, polybutadiene, polybutadiene derivatives, polyurethane, polyurethane derivatives, styrene-butadiene, styrene-butadiene-styrene, acrylonitrile-butadiene, acrylonitrile-butadiene-styrene, acrylonitrile-ethylene-styrene, polyacrylates, polychloroprene, ethylene-vinyl acetate and poly (vinyl chloride).

The addition of elastomeric polymers and polyurethane polymers also help provide wash stability and chemical stability.

The polymeric composition of the present invention is useful as a release layer (i.e., transfer layer) in an imaging material. The imaging material of the present invention comprises a substrate, release layer, an optional barrier layer, and an optional image-receiving layer.

The imaging material of the present invention can be imaged upon using electronic means or craft-type marking. The electronic means may be, for example, electrostatic printers including but not limited to laser printers or laser copiers (color or monochromatic). In another embodiment, the invention may also be practiced with ink jet or thermal transfer printers. The present invention may also be practiced with offset printing (conventional printing) or screen printing. Further, the present invention may be practiced using craft-type markings such as, for example, markers, crayons, paints or pens.

When a laser printer or laser copier is used to image the imaging material of the present invention, the imaging material of the present invention may optionally comprise an antistatic layer, which is coated on the backside of the substrate (i.e., the side that was not previously coated with the release layer, etc.). The resulting image can be transferred to a receptor element such as a tee shirt using heat and pressure from a hand iron or a heat press.

In another embodiment of the present invention, the substrate comprises a sheet of a nonwoven cellulosic support, or polyester film support, with at least one release layer comprising an acrylic dispersion, an elastomeric emulsion, a plasticizer, and a water repellent material providing an effective transfer or release layer.

The substrate may, for example, be a nonwoven cellulosic support, or polyester film support, with overcoat layers such as an optional barrier layer comprising a polymer to prevent the toner from adhering to the support; a release layer to effectively transfer and release the release and image layer (s) and which comprises an acrylic dispersion, an elastomeric emulsion, a plasticizer, and a water repellent material; and an optional image receiving layer comprising an acrylic dispersion and optional filler agents (with the purpose of modulating the surface characteristics of the transfer sheet) to facilitate the imaging of the toner. One example of a commercially available substrate is a standard sheet of laser copier/printer paper such as Microprint Laser paper from Georgia Pacific.

The coated substrate is placed in a laser copier or printer (color or monochromatic) and imaged on top of the image receiving layer. The printed sheet is placed image side against a receptor (such as, for example, a tee shirt). Heat and pressure are applied to the non-image side of the substrate to transfer the release layer(s) and the optional image receiving layer(s). The substrate is allowed to cool and then removed from the receptor. In one embodiment of the invention, such as when the barrier layer comprises EVERFLEX G, the substrate may be removed from the receptor before cooling (i.e., "hot peel").

BRIEF DESCRIPTION OF THE DRAWINGS

The present invention will become more fully understood from the detailed description given hereinbelow, and the accompanying drawings that are given by way of illustration only and thus are not limitive of the present invention, and wherein:

FIG. 4 illustrates the step of ironing the transfer element onto a tee shirt or the like.

DETAILED DESCRIPTION OF THE INVENTION

Figure 1:
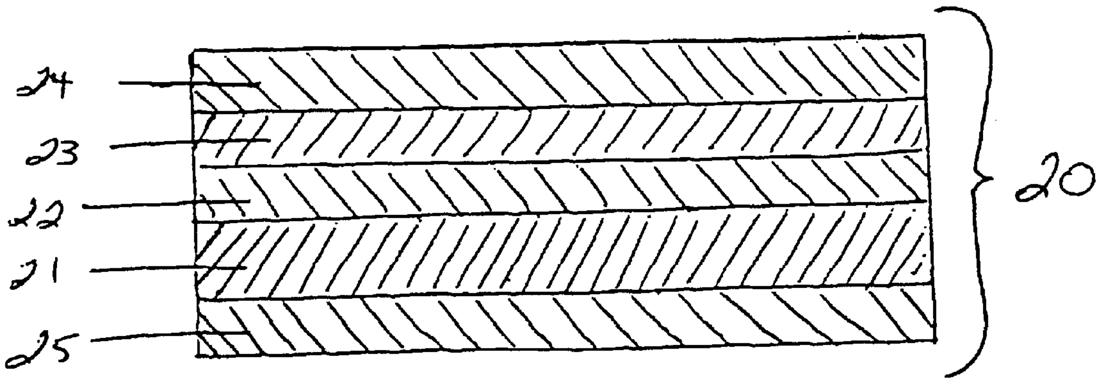
FIG. 1 is a cross-sectional view of the preferred embodiment of the transfer element of the present invention.

The present invention includes a polymeric composition per se, a transfer method comprising said polymeric composition, and an imagable transfer sheet comprising said polymeric composition. The invention further relates to a method of imaging the transfer sheet, and a method of transferring the image from the transfer sheet to a receptor element.

In one embodiment of the present invention, the polymeric composition comprises an ethylene acrylic acid dispersion, an elastomeric emulsion, a polyurethane dispersion, and polyethylene glycol. In another embodiment of the invention, the polymeric composition comprises an ethylene acrylic acid dispersion, a wax dispersion, and a retention aid. The polymeric composition of the present invention preferably has a melting point in the range of from 65° C. to about 180° C. The polymeric composition of the invention comprises the release layer of the imagable transfer sheet of the present invention.

Accordingly, the present invention comprises a substrate coated with the above-mentioned release layer and optional barrier layer, image receiving layers, and/or antistatic layer. Because the release layer also provides adhesion to the receptor, no separate adhesive layers are required.

A. The Transfer Material

1. Substrate

The substrate is the support material for the transfer sheet onto which an image is applied. Preferably, the substrate will provide a surface that will promote or at least not adversely affect image adhesion and image release. An appropriate substrate may include but is not limited to a cellulosic nonwoven web or film, such as a smooth surface, heavyweight (approximately 24 lb.) laser printer or color copier paper stock or laser printer transparency (polyester) film. Preferably, the substrate of the present invention is a sheet of laser copier/printer paper or a polyester film base. However, highly porous substrates are less preferred because they tend to absorb large amounts of the coating(s) or toner in copiers without providing as much release. The particular substrate used is not known to be critical, so long as the substrate has sufficient strength for handling, copying, coating, heat transfer, and other operations associated with the present invention. Accordingly, in accordance with some embodiments of the present invention, the substrate may be the base material for any printable material, such as described in U.S. Pat. No. 5,271,990 to Kronzer.

In accordance with other embodiments of the invention, the substrate must be usable in a laser copier or laser printer. A preferred substrate for this embodiment is equal to or less than approximately 4.0 mils thick.

Since this particular substrate is useable in a laser copier or laser printer, antistatic agents may be present. The antistatic agents may be present in the form of a coating on the back surface of the support as an additional layer. The back surface of the support is the surface that is not coated with the release layer, optional barrier layer, etc.

When the antistatic agent is applied as a coating onto the back surface of the support, the coating will help eliminate copier or printer jamming by preventing the electrostatic adhesion of the paper base to the copier drum of laser and electrostatic copiers and printers. Antistatic agents, or "antistats" are generally, but not necessarily, conductive polymers that promote the flow of charge away from the paper. Antistats can also be "humectants" that modulate the level of moisture in a paper coating that affects the build up of charge. Antistats are commonly charged tallow ammonium compounds and complexes, but also can be complexed organometallics. Antistats may also be charged polymers that have a similar charge polarity as the copier/printer drum; whereby the like charge repulsion helps prevent jamming.

Antistatic agents include, by way of illustration, derivatives of propylene glycol, ethylene oxide-propylene oxide block copolymers, organometallic complexes such as titanium dimethylacrylate oxyacetate, polyoxyethylene oxide-polyoxyproylene oxide copolymers and derivatives of cholic acid.

More specifically, commonly used antistats include those listed in the *Handbook of Paint and Coating Raw Materials*, such as t-Butylaminoethyl methacrylate; Capryl hydroxyethyl imidazoline; Cetethyl morpholinium ethosulfate; Cocoyl hydroxyethyl imidazoline Di(butyl, methyl pyrophosphato) ethylenetitanate di(dioctyl, hydrogen phosphite); Dicyclo(dioctyl)pyrophosphato; titanate; Di(dioctylphosphato) ethylene titanate; Dimethyl diallyl ammonium chloride; Distearyldimonium chloride; N,N'-Ethylene bis-ricinoleamide; Glyceryl mono/dioleate; Glyceryl oleate; Glyceryl stearate; Heptadecenyl hydroxyethyl imidazoline; Hexyl phosphate; N(β-Hydroxyethyl) ricinoleamide; N-(2-Hydroxypropyl)benzenesulfonamide; Isopropyl4-aminobenzenesulfonyl di(dodecylbenzenesulfonyl)titanate; Isopropyl dimethacryl isostearoyl titanate; isopropyltri(dioctylphosphato)titanate; Isopropyl tri (dioctylpyrophosphato)titanate; Isopropyl tri(N ethylaminoethylamino)titanate; (3-Lauramidopropyl) trimethyl ammonium methyl sulfate; Nonyl nonoxynol-15; Oleyl hydroxyethylimidazoline; Palmitic/stearic acid mono/diglycerides; PCA; PEG-36 castor oil; PEG-10 cocamine; PEG-2 laurate; PEG-2; tallowamine; PEG-5 tallowamine; PEG-15 tallowamine; PEG-20 tallowamine; Poloxamer 101; Poloxamer 108; Poloxamer 123; Poloxamer 124; Poloxamer 181; Poloxamer 182; Polaxamer 184; Poloxamer 185; Poloxamer 188; Poloxamer 217; Poloxamer 231; Poloxamer 234; Poloxamer 235; Poloxamer 237; Poloxamer 282; Poloxamer 288; Poloxamer 331; Polaxamer 333; Poloxamer 334; Poloxamer 335; Poloxamer 338; Poloxamer 401; Poloxamer 402; Poloxamer 403; Poloxamer 407; Poloxamine 304; Poloxamine 701; Poloxamine 704; Polaxamine 901; Poloxamine 904; Poloxamine 908; Poloxamine 1107; Poloxamine 1307; Polyamide/epichlorohydrin polymer; Polyglyceryl-10 tetraoleate; Propylene glycol laurate; Propylene glycol myristate; PVM/MA copolymer; polyether; Quaternium-18; Slearamidopropyl dimethyl-β-hydroxyethyl ammonium dihydrogen phosphate; Stearamidopropyl dimethyl-2-hydroxyethyl ammonium nitrate; Sulfated peanut oil; Tetra (2, diallyoxymethyl-1 butoxy titanium di(di-tridecyl) phosphite; Tetrahydroxypropyl ethylenediamine; Tetraisopropyl di(dioctylphosphito) titanate; Tetraoctyloxytitanium di(ditridecylphosphite); Titanium di(butyl, octyl pyrophosphate) di(dioctyl, hydrogen phosphite) oxyacetate; Titanium di(cumylphenylate) oxyacetate; Titanium di(dioctylpyrophosphate) oxyacetate; Titanium dimethacrylate oxyacetate.

Preferably, Marklear AFL-23 or Markstat AL-14, polyethers available from Witco Industries, are used as an antistatic agents.

The antistatic coating may be applied on the back surface of the support by, for example, spreading a solution comprising an antistatic agent (i.e., with a metering rod) onto the back surface of the support and then drying the substrate.

An example of a preferred substrate of the present invention is Georgia Pacific brand Microprint Laser Paper. However, any commercially available laser copier/printer paper may be used as the substrate in the present invention.

2. The Barrier Layer

The barrier layer is an optional first coating on the substrate. The barrier layer also assists in releasing the optional image receiving layer and the release layer(s). The barrier layer comprises a polymer that may also help prevent the coating and/or toner from adhering to the substrate. When the substrate performs the same function as the barrier layer, the barrier layer is not required. For example, when the substrate is a polyester film base, such as polyacetate, there will be minimal adherence to the substrate by the release layer. Accordingly, a barrier layer will not be required.

Thus, the barrier layer is a coating that separates the release layer from the substrate (i.e., paper). The barrier layer, when necessary, is between the substrate and the release layer. Furthermore, in a preferred embodiment of the invention, the barrier layer is present as both a cold and hot peelable coat, and remains with the support after transfer.

Preferably, the Barrier Layer is any vinyl acetate with a Tg in the range of from −10° C. to 100° C. Alternatively, the Tg may be in the range of from 0° C. to 100° C. EVERFLEX G, with a Tg of about −7°, may be used as a preferred embodiment.

The Barrier Layer, when needed, overlays the substrate. A suitable Barrier Layer may be the barrier layer of U.S. Pat. No. 5,798,179 to Kronzer. The Barrier Layer may be composed of a thermoplastic polymer having essentially no tack at transfer temperatures (e.g., 177° C.), a solubility parameter of at least about 19 $(Mpa)^{1/2}$, and a glass transition temperature of at least about 0° C. As used herein, the phrase "having essentially no tack at transfer temperatures" means that the Barrier Layer does not stick to the Release Layer to an extent sufficient to adversely affect the quality of the transferred image. By way of illustration, the thermoplastic polymer may be a hard acrylic polymer or poly(vinyl acetate). For example, the thermoplastic polymer may have a glass transition temperature ($T_g$) of at least about 25° C. As another example, the $T_g$ may be in a range of from about 25° C. to about 100° C. The Barrier Layer also may include an effective amount of a release-enhancing additive, such as a divalent metal ion salt of a fatty acid, a polyethylene glycol, or a mixture thereof. For example, the release-enhancing additive may be calcium stearate, a polyethylene glycol having a molecular weight of from about 2,000 to about 100,000, or a mixture thereof.

In a preferred embodiment of the invention, the barrier layer is a vinyl acetate polymer. An example of this embodiment is Barrier Layer Formulation 1:

Barrier Layer Formulation 1

| Components | Parts |
|---|---|
| Vinyl acetate-dibutyl maleate polymer dispersion (such as EVERFLEX G, Hampshire Chemical Corporation) | 50 parts |
| Water | 50 parts. |

Barrier Layer Formulation 1 may be prepared as follows: fifty parts of a vinyl acetate-dibutyl maleate polymer dispersion are combined with fifty parts of water by gentle stirring. The stirring is continued for approximately ten minutes at a moderate stir rate (up to but not exceeding a rate where cavitation occurs). The amount of water added may vary. The only limitation is that sufficient water is added to make the dispersion coatable on the substrate.

When EVERFLEX G, described above, is used as part of the Barrier Layer, the Barrier Layer possesses both hot and cold peel properties. That is, after heat is applied to the coated transfer sheet and the image is transferred to the receptor, the transfer sheet may be peeled away from the receptor before it is allowed to cool (i.e., hot peel). Alternatively, the transfer sheet is allowed to cool before it is peeled away from the receptor (i.e., cold peel).

In another embodiment of the present invention, the barrier layer contains a polyester resin such as polymethyl methacrylate (PMMA) in a molecular weight range of from 15,000 to 120,000 Daltons. An example of the PMMA-containing barrier layer is Barrier Layer Formulation 2:

Barrier Layer Formulation 2

| Components | Parts |
|---|---|
| Acetone 99.5% | 40 parts (weight) |
| 2-Propanol 99.5% | 40 parts (weight) |
| PMMA | 20 parts (weight). |

Barrier Layer Formulation 2 may be prepared as follows: The acetone and 2-propanol are weighed and mixed. The mixture is stirred. One half of the PMMA is added to the mixture while the mixture is heated to about 25° C. and stirring continues until the PMMA is dispersed. At this point, stirring continues until the remainder of the PMMA is added to the mixture and is dispersed. The mixture is then allowed to cool to room temperature.

By way of example, the barrier layer may comprise the following polymers which have suitable glass transition temperatures as disclosed in U.S. Pat. No. 5,798,179 to Kronzer:

| Polymer Type | Product Identification |
|---|---|
| Polyacrylates | Hycar ® 26083, 26084, 26120, 26104, 26106, 26322, B. F. Goodrich Company, Cleveland, Ohio<br>Rhoplex ® HA-8, HA-12, NW-1715, Rohm and Haas Company, Philadelphia, Pennsylvania<br>Carboset ® XL-52, B. F. Goodrich Company, Cleveland, Ohio |
| Styrene-butadiene copolymers | Butofan ® 4264, BASF Corporation, Samia, Ontario, Canada<br>DL-219, DL-283, Dow Chemical Company, Midland, Michigan |
| Ethylene-vinyl acetate copolymers | Dur-O-Set ® E-666, E-646, E-669, National Starch & Chemical Co., Bridgewater, New Jersey |
| Nitrile rubbers | Hycar ® 1572, 1577, 1570 x 55, B. F. Goodrich Company, Cleveland, Ohio |
| Poly(vinyl chloride) | Vycar ® 352, B. F. Goodrich Company, Cleveland, Ohio |
| Poly (vinyl acetate) | Vinac XX-210, Air Products and Chemicals, Inc., Napierville, Illinois |
| Ethylene-acrylate copolymers | Michem ® Prime, 4990, Michelman, Inc., Cincinnati, Ohio<br>Adcote 56220, Morton Thiokol, Inc., Chicago, Illinois |

The barrier layer may also comprise Poly(ethylene terephthalate) (PET), Poly(butylene terethphalate) (PBT), or their derivatives, that are members of the polyester class. PET or PBT, or combinations, are known for their ability to self crosslink, upon the application of energy; and therefore, have thermosetting properties. Preferred formulations include the PET formulations produced by EvCo, Inc. by the tradenames of the EvCote PWR series such as EvCote PWR-25 and PWRH-25. Improved performance may be gained by the addition of crosslinking agents such aziridine, melamine, and organometallic agents or derivatives thereof. Examples of commercially available crosslinkers include Ionac PFAZ-322 (Sybron, Inc.; an Aziridine derivative), Cymel 323 (EvCo, Inc.; a melamine) and the Tyzor LA (DuPont; a Titanate organometallic derivative). The crosslinker concentration may range from 0.001 to 10%; preferred 0.01 to 1%; most preferred 0.01 to 0.5% based on the weight of PET. PET may be prepared by known methods, such as by polycondensation reaction comprising terephthalic acid and ethylene glycol or ethylene oxide. The PBT may be prepared by known methods, such as by a polycondensation reaction involving butylene glycol and terephthalic acid (Polymer Chemistry, An Introduction, $2^{nd}$ Edition, Malcomb P. Stevens, Oxford Press (1990)).

3. The Release Layer

The release layer is formed on the substrate between an optional barrier layer and an optional image receiving layer. The release layer of the present invention facilitates the transfer of the image from the substrate to the receptor. That is, the release layer of the present invention must provide the properties to effectively transfer the release layer and any images and/or optional layers thereon. Further, the release layer must also provide for adhesion of the release layer and the optional image receiving (i.e., containing both image and non-image areas) layer to the receptor without the requirement of a separate surface adhesive layer.

The release layer of the invention is a polymeric composition comprising a film forming binder, an elastomeric emulsion, a water repellant and a plasticizer. Preferably, the film forming binder is selected from the group consisting of polyester, polyolefin and polyamide or blends thereof. More preferably, the film forming binder is selected from the group consisting of polyacrylates, polyacrylic acid, polymethacrylates, polyvinyl acetates, co-polymer blends of vinyl acetate and ethylene/acrylic acid co-polymers, ethylene-acrylic acid copolymers, polyolefins, and natural and synthetic waxes. The natural and synthetic waxes are selected from the group consisting of carnauba wax, mineral waxes, montan wax, derivatives of montan wax, petroleum waxes, polyethylene and oxidized polyethylene waxes.

The release layer is preferably prepared from, for example, a coating composition comprising an acrylic dispersion, an elastomeric emulsion, a plasticizer, and a water repellant. The water repellant may comprise, for example, polyurethane for the purpose of providing water resistance for toner retention and/or a retention aid.

Without being bound by any theory, upon back surface heating of the substrate, the release layer would undergo a solid to solution phase transition resulting, upon contact with a receptor, in a transfer of the release layer and any optional layers to the receptor. Edge to edge adhesion to the receptor occurs upon cooling of the release layer onto the receptor. Upon cooling, an image receiving layer is transferred onto the receptor by removing the substrate. The release layer of the present invention protects any transferred image, provides mechanical and thermal stability, as well as washability, preferably without losing the flexibility of the textile. That is, the release layer should also provide a colorfast image (e.g. washproof or wash resistant) when transferred to the receptor surface. Thus, upon washing the receptor element (e.g. tee shirt) the image should remain intact on the receptor.

Further, the release layer satisfies the requirement for compatible components, in that the component dispersions remain in their finely dispersed state after admixture, without coagulating or forming clumps or aggregated particles which would adversely affect image quality. Additionally, the release layer is preferably non-yellowing.

The release layer has a low content of organic solvents, and any small amounts present during the coating process are sufficiently low as to meet environmental and health requirements. More specifically, the release layer preferably has a content of organic solvents of less than 2% weight by weight of components. More preferably, the release layer has a content of organic solvents of less than 1% weight by weight of components.

Various additives may be incorporated into the release layer or the barrier and/or image receiving layer(s). Retention aids, wetting agents, plasticizers and water repellents are examples. Each will be discussed in turn, below.

Retention Aids

An additive may be incorporated for the purpose of aiding in the binding of the applied colorant such as water-based ink jet colorants and/or dry or liquid toner formulations. Such additives are generally referred to as retention aids. Retention aids that have been found to bind colorants generally fall into three classes: silicas, latex polymer and polymer retention aids. Silicas and silicates are employed when the colorant is water-based such as ink jet formulations. An example of widely used silicas are the Ludox (DuPont) brands. Polyvinyl alcohol represents as class of polymers that have also been applied to the binding of ink jet dyes. Other polymers used include anionic polymers such as Hercobond 2000 (Hercules). Reten 204LS (Hercules) and Kymene 736 (Hercules) are catonic amine polymer-epichlorohydrin adducts used as retention aids. Latex polymers include, by way of illustration, vinyl polymers and vinyl co-polymer blends such as ethylene-vinyl acetate, styrene-butadiene copolymers, polyacrylate and other polyacrylate-vinyl copolymer blends.

Wetting Agents and Rheology Modifiers

Wetting agents, rheology modifiers and surfactants may also be included in the Release Layer. Such agents may either be nonionic, cationic or anionic. The surfactant selected should be compatible with the class of polymers used in a formulation. For example, anionic polymers require the use of anionic or non-ionic wetting agents or surfactants. Likewise, cationic surfactants are stable in polymer solution containing cationic or non-ionic polymers. Examples of surfactants or wetting agents include, by way of illustration, alkylammonium salts of polycarboxylic acid, salts of unsaturated polyamine amides, derivatives of nonoxynol, derivatives of octoxynols (Triton X-100 and Triton X-114 (Union Carbide), for example), dimethicone copolymers, silicone glycol copolymers, polysiloxane-polyether copolymers, alkyl polyoxy carboxylates, tall oil fatting acids, ethylene oxide-propylene oxide block copolymers and derivatives of polyethylene glycol.

Viscosity modifiers may also be included. Generally, various molecular weight polyethylene glycols are incorporated to serve this purpose. Polyethylene glycols used generally range in molecular weight from 100 to 500,000 with molecular weights between 200 and 1000 being the most useful in this application.

Plasticizers

Plasticizers may be included in order to soften hard polymer and polymer blend additions. Plasticizers used include, by way of illustration, aromatic compounds such as di-octyl phthalate, di-decyl phthalate and derivatives thereof and tri-2-ethylhexyl trimellitate. Aliphatic plasticizers include ethylhexyl adipates (and derivatives thereof) and ethylhexyl sebacates (and derivatives thereof). Polyethylene glycol may be used. Epoxidized linseed or soya oils may also be incorporated but generally are not used due to yellowing and chemical instability upon heat application.

Water Repellants

Water repellant aids may also be incorporated into order to improve the wash/wear resistance of the transferred image. Examples of additives include polyurethanes, wax dispersions such as carnauba wax, mineral waxes, montan wax, derivatives of montan wax, petroleum waxes, synthetic waxes such as polyethylene and oxidized polyethylene waxes, hydrocarbon resins, amorphous fluoropolymers and polysiloxane derivatives.

Particularly when the imaging method is a laser printer or copier, the release layer of the present invention preferably excludes wax dispersions derived from, for example, a group including but not limited to natural waxes such as carnauba wax, mineral waxes, montan wax, derivatives of montan wax, petroleum waxes, and synthetic waxes such as polyethylene and oxidized polyethylene waxes. If the imaging method used is a nonlaser printer/copier method, waxes are not excluded from use in the transfer material. However, the amount of waxes that may be present in the transfer material of the invention when intended for use in laser printers or copiers must be sufficiently low as (e.g. 30 wt % or less, preferably 10 wt % of less, most preferably 5 wt % or less) to avoid adverse affects on copier or printer operation. That is, the amount of wax present must not cause melting in the printer or copier.

The above properties make this release layer highly suited for compatibilizing the stringent requirements of the electrostatic imaging process with the requirements of heat transfer image technology to provide a product having good image quality and permanence under the demanding conditions of textile application, wear and wash resistance in use, and adhesion to wash resistance on decorated articles. The release layer is preferably a polymeric coating designed to provide a release from the substrate and adherence to a receptor when heat is applied to the back of the substrate.

Suitable examples of the release layers of the invention are exemplified below.

In the most preferred embodiment of the invention, the release layer comprises an ethylene acrylic acid co-polymer dispersion, an elastomeric emulsion, a polyurethane dispersion, and polyethylene glycol. An example of this embodiment is Release Layer Formulation 1:

Release Layer Formulation 1

| Components | Parts by weight |
|---|---|
| Ethylene Acrylic Acid Co-polymer Dispersion (Michem Prime 4983R, Michelman) | 86 parts |
| Elastomeric emulsion (Hystretch V-29, BFGoodrich) | 5 parts |
| Polyurethane Dispersion (Daotan VTW 1265, Vianova Resins) | 4 parts |
| Polyethylene Glycol (Carbowax Polyethylene Glycol 400, Union Carbide) | 4 parts |
| Polyethylene Glycol Mono ((Tetramethylbutyl) Phenol) Ether (Triton X-100, Union Carbide) | 1 part |

The film forming binder (e.g. acrylic dispersion) is present in a sufficient amount so as to provide adhesion of the release layer and image to the receptor element and is preferably present in an amount of from 46 to 90 weight %, more preferably 70 to 90 weight % based on the total composition of the release layer.

The elastomeric emulsion provides the elastomeric properties such as mechanical stability, flexibility and stretchability, and is preferably present in an amount of from 1 to 45 weight %, more preferably 1 to 20 weight % based on the total composition of the release layer.

The water repellant provides water resistance and repellency, which enhances the wear resistance and washability of the image on the receptor, and is preferably present in an amount of from 0.5 to 7 weight %, more preferably 3 to 6 weight % based on the total composition of the release layer.

The plasticizer provides plasticity and antistatic properties to the transferred image, and is preferably present in an amount of from 1 to 8 weight %, more preferably 2 to 7 weight % based on the total composition of the release layer.

Preferably, the acrylic dispersion is an ethylene acrylic acid co-polymer dispersion that is a film-forming binder that provides the "release" or "separation" from the substrate. The release layer of the invention may utilize the film-forming binders of the image-receptive melt-transfer film layer of U.S. Pat. No. 5,242,739, which is herein incorporated by reference.

Thus, the nature of the film-forming binder is not known to be critical. That is, any film-forming binder can be employed so long as it meets the criteria specified herein. As a practical matter, water-dispersible ethylene-acrylic acid copolymers have been found to be especially effective film forming binders.

The term "melts" and variations thereof are used herein only in a qualitative sense and are not meant to refer to any particular test procedure. Reference herein to a melting temperature or range is meant only to indicate an approximate temperature or range at which a polymer or binder melts and flows under the conditions of a melt-transfer process to result in a substantially smooth film.

Manufacturers' published data regarding the melt behavior of polymers or binders correlate with the melting requirements described herein. It should be noted, however, that either a true melting point or a softening point may be given, depending on the nature of the material. For example, materials such as polyolefins and waxes, being composed mainly of linear polymeric molecules, generally melt over a relatively narrow temperature range since they are somewhat crystalline below the melting point.

Melting points, if not provided by the manufacturer, are readily determined by known methods such as differential scanning calorimetry. Many polymers, and especially copolymers, are amorphous because of branching in the polymer chains or the side-chain constituents. These materials begin to soften and flow more gradually as the temperature is increased. It is believed that the ring and ball softening point of such materials, as determined by ASTM E-28, is useful in predicting their behavior. Moreover, the melting points or softening points described are better indicators of performance than the chemical nature of the polymer or binder.

Representative binders (i.e., acrylic dispersions) for release from the substrate are as follows:

Binder A

Binder A is Michem® 58035, supplied by Michelman, Inc., Cincinnati, Ohio. This is a 35 percent solids dispersion of Allied Chemical's AC 580, which is approximately 10 percent acrylic acid and 90 percent ethylene. The polymer reportedly has a softening point of 102° C. and a Brookfield viscosity of 0.65 pas (650 centipoise) at 140° C.

Binder B

This binder is Michem® Prime 4983R (Michelman, Inc., Cincinnati, Ohio). The binder is a 25 percent solids dispersion of Primacor® 5983 made by Dow Chemical Company. The polymer contains 20 percent acrylic acid and 80 percent ethylene. The copolymer has a Vicat softening point of 43° C. and a ring and ball softening point of 100° C. The melt index of the copolymer is 500 g/10 minutes (determined in accordance with ASTM D-1238).

Binder C

Binder C is Michem® 4990 (Michelman, Inc., Cincinnati, Ohio). The material is 35 percent solids dispersion of Primacor® 5990 made by Dow Chemical Company. Primacor® 5990 is a copolymer of 20 percent acrylic acid and 80 percent ethylene. It is similar to Primacor® 5983 (see Binder B), except that the ring and ball softening point is 93° C. The copolymer has a melt index of 1,300 g/10 minutes and Vicat softening point of 39° C.

Binder D

This binder is Michem® 37140, a 40 percent solids dispersion of a Hoechst-Celanese high density polyethylene. The polymer is reported to have a melting point of 100° C.

Binder E

This binder is Michem® 32535 which is an emulsion of Allied Chemical Company's AC-325, a high density polyethylene. The melting point of the polymer is about 138° C. Michem® 32535 is supplied by Michelman, Inc., Cincinnati, Ohio.

Binder F

Binder F is Michem® 48040, an emulsion of an Eastman Chemical Company microcrystalline wax having a melting point of 88° C. The supplier is Michelman, Inc., Cincinnati, Ohio.

Binder G

Binder G is Michem® 73635M, an emulsion of an oxidized ethylene-based polymer. The melting point of the polymer is about 96° C. The hardness is about 4–6 Shore-D. The material is supplied by Michelman Inc., Cincinnati, Ohio.

The second component of Release Layer Formulation 1 is an elastomeric emulsion, preferably a latex, and is compatible with the other components, and formulated to provide durability, mechanical stability, and a degree of softness and conformability to the layers.

Films of this material must have moisture resistance, low tack, durability, flexibility and softness, but with relative toughness and tensile strength. Further, the material should have inherent heat and light stability. The latex can be heat sensitized, and the elastomer can be self-crosslinking or used with compatible cross-linking agents, or both. The latex should be sprayable, or roll stable for continuous runnability on nip rollers.

Elastomeric latexes of the preferred type are produced from the materials and processes set forth in U.S. Pat. Nos. 4,956,434 and 5,143,971, which are herein incorporated by reference. This curable latex is derived from a major amount of acrylate monomers such as $C_4$ to $C_8$ alkyl acrylate, preferably n-butyl acrylate, up to about 20 parts per hundred of total monomers of a monolefinically unsaturated dicarboxylic acid, most preferably itaconic acid, a small amount of crosslinking agent, preferably N-methyl acrylamide, and optionally another monolefinic monomer.

Using a modified semibatch process in which preferably the itaconic acid is fully charged initially to the reactor with the remaining monomers added over time, a latex of unique polymer architecture or morphology is created, leading to the unique rubbery properties of the cured films produced therefrom.

The third ingredient of Release Layer Formulation 1 is a water resistant aid such as a polyurethane dispersion which provides a self-crosslinking solvent and emulsifier-free aqueous dispersion of an aliphatic urethane-acrylic hybrid polymer which, alone, produces a clear, crack-free film on drying having very good scratch, abrasion and chemical resistance. This ingredient is also a softener for the acrylic dispersion and plasticizer aid.

Such product may be produced by polymerizing one or more acrylate and other ethylenic monomers in the presence of an oligourethane to prepare oligourethane acrylate copolymers. The oligourethane is preferably prepared from diols and diisocyanates, the aliphatic or alicyclic based diisocyanates being preferred, with lesser amounts, if any, of aromatic diisocyanates, to avoid components which contribute to yellowing. Polymerizable monomers, in addition to the usual acrylate and methacrylate esters of aliphatic monoalcohols and styrene, further include monomers with carboxyl groups, such acrylic acid or methacrylic acid, and those with other hydrophylic groups such as the hydroxyalkyl acrylates (hydroxyethyl methacrylate being exemplary). The hydrophylic groups in these monomers render the copolymer product dispersible in water with the aid of a neutralizing agent for the carboxyl groups, such as dimethylethanolamine, used in amount to at least partially neutralize the carboxyl groups after dispersion in water and vacuum distillation to remove any solvents used to prepare the urethane acrylic hybrid. Further formulations may include the addition of crosslinking components such as amino resins or blocked polyisocyanates. Although pigments and fillers could be added to any of the coating layers, such use to uniformly tint or color the coated paper could be used for special effect, but would not be used where an image is desired in the absence of background coloration. Urethane acrylic hybrid polymers are further described in U.S. Pat. No. 5,708,072, and their description in this application is incorporated by reference.

Self crosslinking acrylic polyurethane hybrid compositions can also be prepared by the processes and materials of U.S. Pat. No. 5,691,425, herein incorporated by reference. These are prepared by producing polyurethane macromonomers containing acid groups and lateral vinyl groups, optionally terminal vinyl groups, and hydroxyl, urethane, thiourethane and/or urea groups. Polymerization of these macromonomers produces acrylic polyurethane hybrids which can be dispersed in water and combined with crosslinking agents for solvent-free coating compositions.

Autocrosslinkable polyurethane-vinyl polymers are discussed in detail in U.S. Pat. Nos. 5,623,016 and 5,571,861, and their disclosure of these materials is incorporated by reference. The products usually are polyurethane-acrylic hybrids, but with self-crosslinking functions. These may be carboxylic acid containing, neutralized with, e.g. tertiary amines such as ethanolamine, and form useful adhesives and coatings from aqueous dispersion.

The elastomeric emulsion and polyurethane dispersion are, generally, thermoplastic elastomers. Thermoplastic elastomeric polymers are polymer blends and alloys which have both the properties of thermoplastic polymers, such as having melt flow and flow characteristics, and elastomers, which are typically polymers which cannot melt and flow due to covalent chemical crosslinking (vulcanization). Thermoplastic elastomers are generally synthesized using two or more monomers that are incompatible; for example, styrene and butadiene. By building long runs of polybutadiene with intermittent polystyrene runs, microdomains are established which imparts the elastomeric quality to the polymer system. However, since the microdomains are established through physical crosslinking mechanisms, they can be broken by application of added energy, such as heat from a hand iron, and caused to melt and flow; and therefore, are elastomers with thermoplastic quality.

Thermoplastic elastomers have been incorporated into the present invention in order to provide the image transfer system with elastomeric quality. Two thermoplastic elastomer systems have been introduced; that is, a polyacrylate terpolymer elastomer (for example, Hystretch V-29) and an aliphatic urethane acryl hybrid (for example, Daotan VTW 1265). Thermoplastic elastomers can be chosen from a group that includes, for example, ether-ester, olefinic, polyether, polyester and styrenic thermoplastic polymer systems. Specific examples include, by way of illustration, thermoplastic elastomers such as polybutadiene, polybutadiene derivatives, polyurethane, polyurethane derivatives, styrene-butadiene, styrene-butadiene-styrene, acrylonitrile-butadiene, acrylonitrile-butadiene-styrene, acrylonitrile-ethylene-styrene, polyacrylates, polychloroprene, ethylene-vinyl acetate and poly (vinyl chloride). Generally, thermoplastic elastomers can be selected from a group having a glass transition temperature (Tg) ranging from about −50° C. to about 25° C.

The fourth component of Release Layer Formulation 1 is a plasticizer such as a polyethylene glycol dispersion which provides mechanical stability, water repellency, and allows for a uniform, crack-free film. Accordingly, a reason to add the polyethylene glycol dispersion is an aid in the coating process. Further, the polyethylene glycol dispersion acts as an softening agent. A preferred fourth component is Carbowax Polyethylene Glycol 400, available from Union Carbide.

An optional fifth ingredient of Release Layer Formulation 1 is a surfactant and wetting agent such as polyethylene glycol mono ((tetramethylbutyl) phenol) ether.

Release Layer Formulation 1, as a preferred embodiment of the invention suitable for laser copiers and laser printers, is wax free.

Release Layer Formulation 1 may be prepared as follows: five parts of the elastomer dispersion are combined with eighty-six parts of an ethylene acrylic acid co-polymers dispersion by gentle stirring to avoid cavitation. Four parts of a polyurethane dispersion are then added to the mixture. Immediately following the addition of a polyurethane dispersion, four parts of a polyethylene glycol and one part of an nonionic surfactant (e.g., Triton X-100) are added. The entire mixture is allowed to stir for approximately fifteen minutes at a moderate stir rate (up to but not exceeding a rate where cavitation occurs). Once thoroughly combined, the mixture is filtered (for example, through a 53 μm nylon mesh).

In another embodiment of the invention, the release layer comprises an acrylic binder and a wax emulsion. The release layer may further contain a retention aid such as Hercobond 2000®. The retention aid provides water resistance, which enhances the washability of the image on the receptor. An example of this embodiment may be found in Release Layer Formulation 2:

| Release layer Formulation 2 | |
|---|---|
| Components | Parts |
| Ethylene Acrylic Acid Co-polymers dispersion (Michem Prime 4938R, Michelman) | 74 parts (weight) |
| Wax Dispersion (Michelman 73635M, Michelman) | 25 parts (weight) |
| Retention Aid (Hercobond 2000, Hercules) | 1 part (weight) |

Alternatively, the binders suitable for Release Layer Formulation 1 may be used in lieu of the above-described ethylene acrylic acid copolymer dispersion.

Formulation 2 works in a laser printer or copier despite the presence of wax since the wax is present in sufficiently low amounts so as to not adversely affect imaging such as, for example, by melting within the printer or copier (i.e., at most about 25 parts (weight)).

Formulation 2 may be prepared in the following manner: the ethylene acrylic acid co-polymer dispersion and the wax dispersion are stirred (for example in a beaker with a stirring bar). The retention aid is added, and the stirring continues until the retention aid is completely dispersed.

In another embodiment of the invention, the above-described release layer is divided into two separate layers. An example of this embodiment is a layer comprising ethylene acrylic acid that allows release or separation. An elastomer and polyurethane of the present invention, as well as any additives discussed above, are combined in a second layer that provides the above-described transfer qualities (i.e., washability).

4. The Image Receiving Layer

The image receiving layer functions as a retention aid for the image. Accordingly, the image receiving layer must be modified according to the marker that is being applied.

In an embodiment where the substrate is marked with a laser copier or printer, the optional image receiving layer is an acrylic coating upon which an image is applied. The image receiving layer may comprise a film-forming binder selected from the group comprising of ethylene-acrylic acid copolymers, polyolefins, and waxes or combinations thereof. A preferred binder, especially when a laser copier or laser printer is used in accordance with this invention is an ethylene acrylic acid co-polymer dispersion. Such a dispersion is represented by Image Receiving Layer Formulation 1:

| Image Receiving Layer Formulation 1 | |
|---|---|
| Components | Parts |
| Ethylene Acrylic Acid Co-polymers Dispersion (Michem Prime 4983R, Michelman). | 100 parts |

Alternatively, the binders suitable for Release Layer Formulation 1 may be used in lieu of the above-described ethylene acrylic acid copolymer dispersion.

In a preferred embodiment of the invention, when an ink jet printer is used in accordance with the present invention, the image receiving layer may utilize the materials of the fourth layer of U.S. Pat. No. 5,798,179. Thus, for practicing the present invention using an ink jet printer, the image receiving layer may comprise particles of a thermoplastic polymer having largest dimensions of less than about 50 micrometers. Preferably, the particles will have largest dimensions of less than about 50 micrometers. More preferably, the particles will have largest dimensions of less than about 20 micrometers. In general, the thermoplastic polymer may be any thermoplastic polymer which meets the criteria set forth herein. Desirably, the powdered thermoplastic polymer will be selected from the group consisting of polyolefins, polyesters, polyamides, and ethylene-vinyl acetate copolymers.

The Image Receiving Layer also includes from about 10 to about 50 weight percent of a film-forming binder, based on the weight of the thermoplastic polymer. Desirably, the amount of binder will be from about 10 to about 30 weight percent. In general, any film-forming binder may be employed which meets the criteria set forth herein. When the Image Receiving Layer includes a cationic polymer as described below, a nonionic or cationic dispersion or solution may be employed as the binder. Suitable binders include polyacrylates, polyethylenes, and ethylene-vinyl acetate copolymers. The latter are particularly desired because of their stability in the presence of cationic polymers. The binder desirably will be heat softenable at temperatures of about 120° C. or lower.

The basis weight of the Image Receiving Layer may vary from about 2 to about 30 g/m$^2$. Desirably, the basis weight will be from about 3 to about 20 g/m$^2$. The Image Receiving Layer may be applied to the third layer by means well known to those having ordinary skill in the art, for example, as described herein below. The Image Receiving Layer typically will have a melting point of from about 65° C. to about 180° C. Moreover, the Image Receiving Layer may contain from about 2 to about 20 weight percent of a cationic polymer, based on the weight of the thermoplastic polymer. The cationic polymer may be, for example, an amide-epichlorohydrin polymer, polyacrylamides with cationic functional groups, polyethyleneimines, polydiallylamines, and the like. When a cationic polymer is present, a compatible binder should be selected, such as a nonionic or cationic dispersion or solution. As is well known in the paper coating art, many commercially available binders have anionically charged particles or polymer molecules. These materials are generally not compatible with the cationic polymer which may be used in the Image Receiving Layer.

One or more other components may be used in the Image Receiving Layer. For example, this layer may contain from about 1 to about 20 weight percent of a humectant, based on the weight of the thermoplastic polymer. Desirably, the humectant will be selected from the group consisting of ethylene glycol and poly(ethylene glycol). The poly(ethylene glycol) typically will have a weight-average molecular weight of from about 100 to about 40,000. A poly(ethylene glycol) having a weight-average molecular weight of from about 200 to about 800 is particularly useful.

The Image Receiving Layer also may contain from about 0.2 to about 10 weight percent of an ink viscosity modifier, based on the weight of the thermoplastic polymer. The viscosity modifier desirably will be a poly(ethylene glycol) having a weight-average molecular weight of from about 100,000 to about 2,000,000. The poly(ethylene glycol) desirably will have a weight-average molecular weight of from about 100,000 to about 600,000.

Other components which may be present in the Image Receiving Layer include from about 0.1 to about 5 weight percent of a weak acid and from about 0.5 to about 5 weight percent of a surfactant, both based on the weight of the thermoplastic polymer. A particularly useful weak acid is citric acid. The term "weak acid" is used herein to mean an acid having a dissociation constant less than one (or a negative log of the dissociation constant greater than 1).

The surfactant may be an anionic, a nonionic, or a cationic surfactant. When a cationic polymer is present in the Image Receiving Layer, the surfactant should not be an anionic surfactant. Desirably, the surfactant will be a nonionic or cationic surfactant. However, in the absence of the cationic polymer, an anionic surfactant may be used, if desired. Examples of anionic surfactants include, among others, linear and branched-chain sodium alkylbenzenesulfonates, linear and branched-chain alkyl sulfates, and linear and branched-chain alkyl ethoxy sulfates. Cationic surfactants include, by way of illustration, tallow trimethylammonium chloride. Examples of nonionic surfactants, include, again by way of illustration only, alkyl polyethoxylates, polyethoxylated alkylphenols, fatty acid ethanol amides, complex polymers of ethylene oxide, propylene oxide, and alcohols, and polysiloxane polyethers. More desirably, the surfactant will be a nonionic surfactant.

The image receiving layer may contain the addition of filler agents with the purpose of modulating the surface characteristics of the present invention. The surface roughness and coefficient of friction may need to be modulated depending on such factors as desired surface gloss and the imaging device's specific paper feeding requirements. The filler can be selected from a group of polymers such as, for example, polyacrylates, polyacrylics, polyethylene, polyethylene acrylic copolymers and polyethylene acrylate copolymers, vinyl acetate copolymers and polyvinyl polymer blends that have various particle dimensions and shapes. Typical particle sizes may range from 0.1 to 500 microns. Preferably, the particle sizes range from 5 to 100 microns. More preferably, the particle sizes range from 5 to 30 microns. The filler may also be selected from a group of polymers such as, for example, cellulose, hydroxycellulose, starch and dextran. Silicas and mica may also be selected as a filler. The filler is homogeneously dispersed in the image layer in concentrations ranging from 0.1 to 50%. Preferably, the filler concentration range is 1 to 10 percent. Below is a preferred image receiving layer formulation that further contains a filler agent:

Image Receiving Layer Formulation 2

| Compound | Parts |
|---|---|
| Ethylene Acrylic Copolymer Dispersion (Michem 4983R, Michelman) | 90 to 99 |
| Ethylene Vinyl Acetate Copolymer Powder (Microthene FE-532-00, Equistar Chemical) | 10 to 1 |

An additional preferred image receiving layer formulation that further contains a filler agent is as follows:

Image Receiving Layer Formulation 3

| Compound | Parts |
|---|---|
| Ethylene Acrylic Copolymer Dispersion (Michem 4983R, Michelman) | 90 to 99 |
| Oxidized polyethylene homopolymer (ACumist A-12, Allied Signal Chemical) | 10 to 1 |

By way of illustration, the image receiving layer may optionally comprise the following formulation compositions:

| Formulation | Description |
|---|---|
| A | 100 parts Orgasol 3501 EXDNAT 1 (a 10-micrometer average particle size, porous, copolymer of nylon 6 and nylon 12 precursors), 25 parts Michem Prime 4983, 5 parts Triton X100 and 1 part Methocel A-15 (methyl cellulose). The coating weight is 3.5 lb. per 1300 square feet. |
| B | Like A, but with 5 parts of Tamol 731 per 100 partsOrgasol 3501, and the Metholcel A-15 is omitted. |
| C | Like a Reichold 97-635 release coat (a modified poly(vinyl acetate)), but containing 50 parts of Tone 0201 (a low molecular weight polycaprolactone) per 100 parts Orgasol 3501. |
| D | 100 parts Orgasol 3501, 5 parts Tamol 731, 25 parts Michel Prime 4983 and 20 parts PEG 20M. |
| E | 100 parts Orgasol 3501, 5 parts Tamol 731, 25 parts Michel Prime 4983 and 5 parts PEG 20M (a polyethylene glycol having a molecular weight of 20,000). |
| F | 100 parts Orgasol 3501, 5 parts Tarnol 731, 25 parts Michem Prime 4983 and 20 parts PEG 20M (an ethylene glycol oligomer having a molecular weight of 200). |
| G | 100 parts Orgasol 3501, 5 parts Tamol 731 and 25 parts Sancor 12676 (Sancor 12676 is a heat sealable polyurethane). |

The various layers of the transfer material are formed by known coating techniques, such as by curtain coating, Meyer rod, roll, blade, air knife, cascade and gravure coating procedures.

The first layer to be coated on the substrate is the optional barrier layer. The barrier layer, if present, is followed by the release layer, and then the optional image receiving layer.

In referring to FIG. 1, there is generally illustrated a cross-sectional view of the transfer sheet 20 of the present invention. The substrate 21 comprises a top and bottom surface. The optional barrier layer 22 is coated onto the top surface of the substrate 21. The release layer 23 is then coated onto the barrier layer 22. Finally, the image receiving layer 24 is coated on top of the release layer 23. Each component in the substrate coating plays a role in the transfer process. The barrier layer solution prevents the release layer from permanently adhering to the paper stock if paper is used as a support. Within the release layer solution, the acrylic polymer provides the release properties to effectively transfer the printed image from the substrate to the receptor. The acrylic polymer within the image receiving layer provides a uniform surface upon which the toner is applied.

After the image receiving layer has completely dried, an antistatic agent discussed above may be applied to the non-coated side of the transfer sheet as an antistatic layer 25. The coating will help eliminate copier or printer jamming by preventing the electrostatic adhesion of the paper base to the copier drum of electrostatic copiers and printers.

B. Receptor

The receptor or receiving element receives the transferred image. A suitable receptor includes but is not limited to textiles including cotton fabric, and cotton blend fabric. The receptor element may also include glass, metal, wool, plastic, ceramic or any other suitable receptor. Preferably the receptor element is a tee shirt or the like.

The image, as defined in the present application may be applied in any desired manner, and is preferably printed toner from a color or monochrome laser printer or a color or monochrome laser copier.

To transfer the image, the imaged transfer element is placed image side against a receptor. A transfer device (i.e., a hand iron or heat press) is used to apply heat to the substrate which in turn releases the image. The temperature transfer range of the hand iron is generally in the range of 110 to 220° C. with about 190° C. being the preferred temperature. The heat press operates at a temperature transfer range of 100 to 220° C. with about 190° C. being the preferred temperature. The transfer device is placed over the non-image side of the substrate and moved in a circular motion (hand iron only). Pressure (i.e., typical pressure applied during ironing) must be applied as the heating device is moved over the substrate (see FIG. 1). After about two minutes to five minutes (with about three minutes being preferred) using a hand iron and 10 seconds to 50 seconds using a heat press (with about twenty seconds being preferred) of heat and pressure, the transfer device is removed from the substrate. The transfer element is optionally allowed to cool from one to five minutes. The substrate is then peeled away from the image which is adhered to the receptor.

Additional embodiments of the present invention include substituting the transfer material of the present invention as the support and transfer layer in U.S. Patent Application No. 60/056,446, wherein the transfer material of the present invention is used in conjunction with a silver halide emulsion layer. Further, silver halide grains may be dispersed in the release layer of the present invention in the same manner as described in U.S. Patent Application No. 60/029,917.

The transfer material of the present invention may be used in place of the support and transfer layer of U.S. Patent Application No. 60/065,806, wherein the transfer material of the present invention is used in conjunction with CYCOLOR technology. The transfer material of the present invention may additionally be used as the transfer layer of U.S. Patent Application No. 60/065,804, wherein the release layer of the present invention is used in conjunction with thermo-autochrome technology. Further, the microcapsules may be dispersed within the release layer of the present invention in lieu of a separate transfer layer as in U.S. Patent Application No. 60/030,933.

An additional embodiment of the present invention is a coated transfer sheet comprising, as a Barrier Layer, a vinyl acetate-dibutyl maleate polymer dispersion that has a Tg of about −7° C. (such as Barrier Layer Formulation 1 comprising EVERFLEX G, discussed above). As the Release Layer, the third layer of U.S. Pat. No. 5,798,179 to Kronzer (U.S. '179) may be used. That is, the Release Layer may comprise a thermoplastic polymer which melts in a range of from about 65° C. to about 180° C. and has a solubility parameter less than about 19 $(Mpa)^{1/2}$.

The third layer in U.S. '179 functions as a transfer coating to improve the adhesion of subsequent layers in order to prevent premature delamination of the heat transfer material. The layer may be formed by applying a coating of a film-forming binder over the second layer. The binder may include a powdered thermoplastic polymer, in which case the third layer will include from about 15 to about 80 percent by weight of a film-forming binder and from about 85 to about 20 percent by weight of the powdered thermoplastic polymer. In general, each of the film-forming binder and the powdered thermoplastic polymer will melt in a range from about 65° C. to about 180° C. For example, each of the film-forming binder and powdered thermoplastic polymer may melt in a range from about 80° C. to about 120° C. In addition, the powdered thermoplastic polymer will comprise particles which are from about 2 to about 50 micrometers in diameter.

The following examples are provided for a further understanding of the invention, however, the invention is not to be construed as limited thereto.

EXAMPLE 1

A transfer sheet of the present invention is prepared as follows:

A barrier layer comprising a vinyl acetate-dibutyl maleate dispersion is coated onto a substrate of the present invention (i.e., onto laser printer or copier paper). For the purposes of this Example, the barrier layer is Barrier Layer Formulation 1. The vinyl acetate-dibutyl maleate polymer dispersion is coated by, for example, applying the dispersion in a long line across the too edge of the paper. Using a #10 metering rod, the bead of solution is spread evenly across the paper. The coated paper is force air dried for approximately one minute. Coating can also be achieved by standard methods such as curtain, air knife, cascade, etc.

Once the barrier layer has completely dried, the release layer solution is coated directly on top of the barrier layer. For this Example, the release layer is Release Layer Formulation 1. The release layer solution is applied in a long line across the top edge of the paper and barrier layer. Using a #30 metering rod, the bead of solution is spread evenly across the substrate. This drawdown procedure is twice repeated. The coated paper is force air dried for approximately two minutes.

Once the release layer has completely dried, the (optional) image receiving layer solution is coated directly on top of the release layer. For the purposes of this Example, the image receiving layer is Image Receiving Layer 1. Accordingly, the image receiving layer comprises ethylene acrylic acid. The image receiving layer solution is applied in a long line across the top edge of the release layer. Using a #4 metering rod, the bead of solution is spread evenly across the substrate. The coated substrate is force air dried for approximately one minute.

Once the substrate is dry, it is placed into a laser printer or copier and imaged upon. The following table can be used as a guide to determine optimum coating weights and thickness of the Barrier, Release and Image Layers:

Coat Weights and Thickness

| | Parts | Wet Coat ($g/m^2$) | Dry Coat ($g/m^2$) | Thickness (mil) |
|---|---|---|---|---|
| Barrier Layer | 50 | 28 | 2 to 20 | 0.05 to 0.80 |
| Release Layer | 95 | 96.2 | 12 to 50 | 0.48 to 2.00 |
| Image Layer | 100 | 20 | 2 to 25 | 0.05 to 1.0 |

EXAMPLE 2

Figure 2:
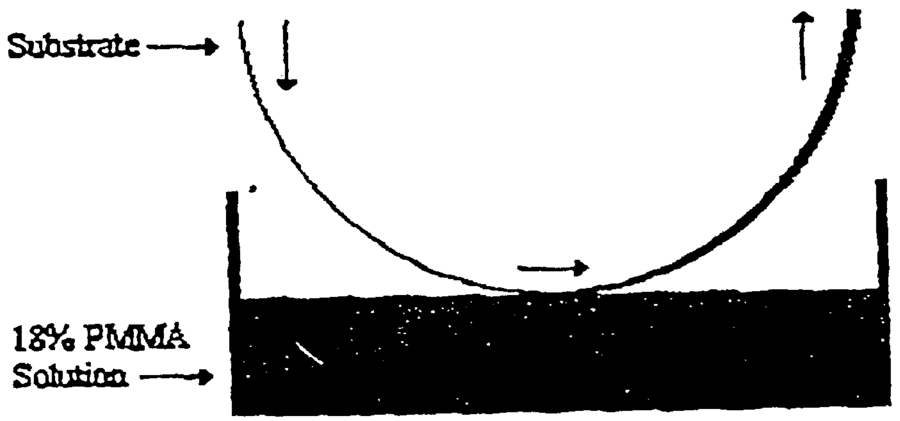
FIG. 2 illustrates an embodiment of the substrate coating procedure.

Referring to FIG. 2, another method of coating the substrate will be described. The first layer to be coated on laser printer or copier paper is a barrier layer of 18% PMMA solution (see, for example Barrier Layer Formulation 2). The 18% PMMA solution is poured into a tray. A sheet of paper is rolled through the solution, coating only one side. Once the paper is coated, the excess PMMA solution is allowed to drain off the paper by dripping and the paper is allowed to dry. Once the barrier layer has completely dried, the release layer solution is coated directly on top of the barrier layer as shown in Example 1. The image receiving layer is applied as shown in Example 1.

EXAMPLE 3

Figure 3:
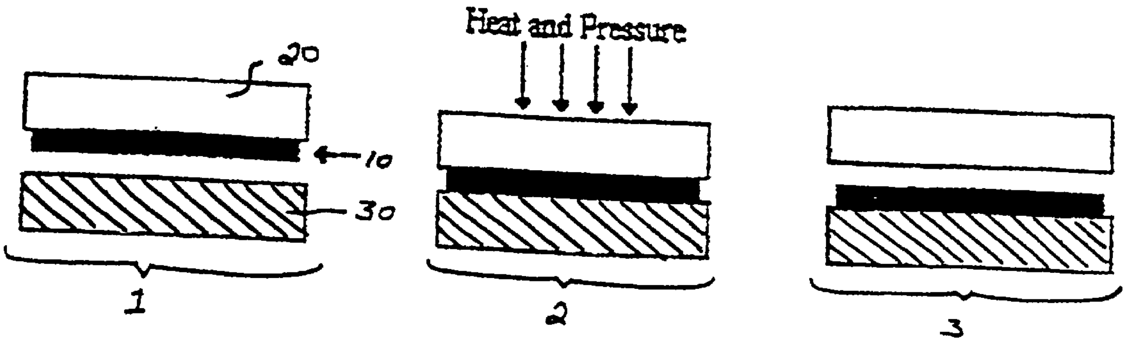
FIG. 3 illustrates the image transfer procedure.

This Example demonstrates the image transfer procedure. Referring to FIG. 3, to transfer the image, (1) the substrate 20 is placed image side against a receptor 30 of the present invention. Accordingly, the receptor 30 of this example includes but is not limited to cotton fabric, cotton blend fabric, glass and ceramic. A transfer device of the present invention (i.e., a hand iron or heat press) is used to apply heat to the substrate 20, which in turn releases the image 10. The temperature transfer range of the hand iron is about 190° C. The heat press operates at a temperature transfer range of about 190° C. (2) The transfer device is placed over the non-image side of the substrate 20 and moved in a circular motion (if the hand iron is used). Usual pressure applied when ironing is applied as the heating device is moved over the substrate 20. After about 180 seconds (15 seconds if using the heat press) of heat and pressure, the transfer device is removed from the substrate 20. The substrate 20 is allowed to cool for about five minutes. (3) The substrate 20 is then peeled away from the receptor.

EXAMPLE 4

Figure 4:
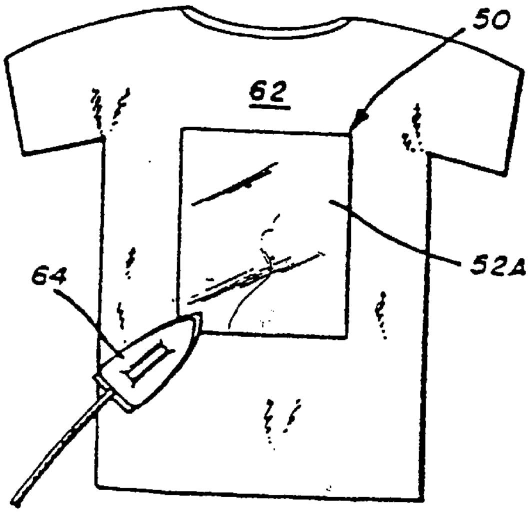

Referring to FIG. 4, the method of applying an image to a receptor element will be described. More specifically, FIG. 3 illustrates how the step of heat transfer from the transfer sheet 50 to a tee shirt or fabric 62 is performed.

The transfer sheet is prepared, and imaged upon as described in the Examples 1 and 2. A tee shirt 62 is laid flat, as illustrated, on an appropriate support surface, and the imaged surface of the transfer sheet 50 is positioned onto the tee shirt. An iron 64 set at its highest heat setting is run and pressed across the back 52A of the transfer sheet. The image and nonimage areas are transferred to the tee shirt and the transfer sheet is removed and discarded.

EXAMPLE 5

This Example demonstrates image transfer and wash results using Release Layer Formulation 2 and Barrier layer Formulation 2.

Receptors are washed five times on normal cycle (cold temperature and cold rinse temperature) using 0.5 cups of concentrated Tide® brand detergent. After each wash cycle the receptors are dried on medium heat for 30 minutes. The washed images are evaluated by a panel evaluating color saturation, image detail, image cracking, and fabric adherence. The images are rated visually using the following scale: acceptable, fair, good and excellent.

Image Transfer and Wash Results

| Components (in parts) | | | | | | | |
|---|---|---|---|---|---|---|---|
| Michem Prime 4983R | Michem Emulsion 73635 | Micro-thene 532 | Ky-mene 557H | Ky-mene 736 | Herco-bond 2000 | Trans-fer Results | Wash Results |
| 47 | 47 | 5 | 1 | | | Fair | Fair |
| 71 | 24 | 4 | 1 | | | Good | Good |
| 70 | 23 | 5 | 1 | | 1 | Fair | Fair |
| 71 | 24 | 4 | | 1 | | Fair | Fair |
| 70 | 24 | 4 | | 2 | | Fair | Fair |

-continued

Image Transfer and Wash Results

| Components (in parts) | | | | | | | |
|---|---|---|---|---|---|---|---|
| Michem Prime 4983R | Michem Emulsion 73635 | Micro-thene 532 | Ky-mene 557H | Ky-mene 736 | Herco-bond 2000 | Trans-fer Results | Wash Results |
| 70 | 23 | 4 | | 3 | | Good | Good |
| 69 | 23 | 4 | | 4 | | Good | Fair |
| 69 | 22 | 4 | | 5 | | Good | Fair |
| 70 | 24 | 4 | | 1 | 1 | Fair | Fair |
| 69 | 23 | 4 | | 2 | 2 | Fair | Fair |
| 71 | 25 | | | 1 | 1 | Good | Good |
| 70 | 24 | | | 2 | 2 | Good | Good |
| 70 | 24 | | | 6 | | Good | Good |
| 70 | 24 | | | | 6 | Good | Fair |
| 69 | 23 | | | | 8 | Good | Fair |
| 75 | 25 | | | | Sep-arate Layer | Accept-able | N/A |

EXAMPLE 6

This Example demonstrates various different compositions of the Release, Barrier, and Image Receiving formulations of the present invention. Additionally, the Example compares the different formulations after washing. The wash test procedure of Example 5 is repeated.

Barrier layer and image receiving layer formulations listed below are combined with various formulations of the release layer. The release layer table indicates which barrier and image receiving layer is used. In the following tables, "A=acceptable" is the minimal level of acceptability, "F=fair" implies a better result than acceptable, "G=good" and "E" implies an excellent result.

Barrier Layer Formulations

| Formula # | Hexane | PE | Acetone | Isopropanol | PMMA |
|---|---|---|---|---|---|
| 1 | 24 | 2 | 34 | 34 | 6 |
| 2 | 27 | 1 | 27 | 27 | 18 |
| 3 | | | 46 | 46 | 8 |
| 4 | | | 37 | 37 | 26 |
| 5 | | | | | |
| 6 | | | | | |
| 7 | | | 43 | 43 | 14 |
| 8 | | | 41 | 41 | 18 |
| 9 | | | | | |
| 10 | | | | | |
| 11 | | | | | |
| 12 | | | | | |
| 13 | | | | | |

| For-mula # | Michem Lube | 10% PVOH | Water | Dym-sol M-40 | Ever-flex G | Dow Latex 615NA | Rhoplex B-15J |
|---|---|---|---|---|---|---|---|
| 1 | | | | | | | |
| 2 | (used as a barrier and release layer, poor results) | | | | | | |
| 3 | | | | | | | |
| 4 | | | | | | | |
| 5 | 100 | | | | | | |
| 6 | | 26 | 74 | | | | |
| 7 | | | | | | | |
| 8 | | | | | | | |
| 9 | | | | 100 | | | |
| 10 | | | | | 100 | (coated over | |

-continued

Barrier Layer Formulations

| | | | | |
|---|---|---|---|---|
| 11 | 50 | 50 | the Ever-flex G) | (coated over the |
| 12 | | 100 | 100 | Ever-flex G) |
| 13 | | 100 | | 100 |

Image Layer Solutions

| Formula # | 5% PVOH | Scriptset 700 resin | Michem Prime 4983R | Michem Emulsion 73635M | 10% PVOH |
|---|---|---|---|---|---|
| 1 | 100 | | | | |
| 2 | | 100 | | | |
| 3 | | | 65 | 33 | 2 |
| 4 | | | 98 | | |
| 5 | | | 100 | | |
| 6 | | | 99 | | |
| 7 | | | 98 | | |
| 8 | | | 92 | | |
| 9 | | | 99 | | |
| 10 | | | | 33 | 2 |
| 11 | | | | | |
| 12 | | | | | |

-continued

Image Layer Solutions

| Formula # | Dow Latex 615NA | Triton X-100 | Triton X-114 | Acrysol WS-50 | Hercobond 2000 | Kymene 736 |
|---|---|---|---|---|---|---|
| 1 | | | | | | |
| 2 | | | | | | |
| 3 | | | | | | |
| 4 | 2 | | | | | |
| 5 | | | | | | |
| 6 | | | 1 | | | |
| 7 | | | 2 | | | |
| 8 | | | 5 | | | |
| 9 | | 1 | | | | |
| 10 | | | | 65 | | |
| 11 | | | | | 100 | |
| 12 | | | | | | 100 |

Release Layer Solutions

| Formula # | Barrier Solution | Image Solution | M. Prime 4983R | M. Emulsion 73635M | Microthene FE 532 | Ropaque | Kymene 557H | Reten | Hercobond 2000 | Paranol SA-209 | Kymene 736 | Results |
|---|---|---|---|---|---|---|---|---|---|---|---|---|
| 1 | 1 | | 100 | | | | | | | | | A |
| 2 | 1 | | 80 | 20 | | | | | | | | G |
| 3 | 1 | | 76 | 19 | 5 | | | | | | | G |
| 4 | 1 | | 72 | 18 | 10 | | | | | | | G |
| 5 | 3 | | 71 | 24 | 5 | | | | | | | G |
| 6 | 3 | | 66 | 22 | 10 | | 2 | | | | | G |
| 7 | 3 | | 67 | 23 | 10 | | | | | | | G |
| 8 | 3 | | 74 | 25 | | 1 | | | | | | A |
| 9 | 3 | | 70 | 24 | 5 | | 1 | | | | | G |
| 10 | 3 | | 70 | 23 | 5 | | 2 | | | | | G |
| 11 | 4 | | 47 | 47 | 6 | | | | | | | F |
| 12 | 4 | | 63 | 32 | 5 | | | | | | | F |
| 13 | 4 | | 50 | 50 | | | | | | | | F |
| 14 | 4 | | 70 | 23 | 5 | | 2 | | | | | F |
| 15 | 5 | | 70 | 22 | 5 | | 3 | | | | | F |
| 16 | 5 | | 76 | 19 | 5 | | | | | | | F |
| 17 | 5 | | 50 | 50 | | | | | | | | F |
| 18 | 4 | | 69 | 24 | 5 | | 2 | | | | | F |
| 19 | 4 | | 69 | 23 | 5 | | 3 | | | | | F |
| 20 | 4 | | 68 | 24 | 5 | | 3 | | | | | F |
| 21 | 4 | | 68 | 23 | 5 | | 4 | | | | | F |
| 22 | 4 | | 70 | 24 | 5 | | | 1 | | | | F |
| 23 | 4 | | 70 | 23 | 5 | | | 2 | | | | F |
| 24 | 4 | | 69 | 23 | 5 | | | 3 | | | | F |
| 25 | 4 | | 69 | 23 | 5 | | | 4 | | | | F |
| 26 | 4 | | 67 | 22 | 5 | | 3 | | 3 | | | F |
| 27 | 4 | | 68 | 23 | 5 | | 3 | | | 1 | | A |
| 28 | 4 | | 71 | 23 | 5 | | | | | | 1 | A |
| 29 | 4 | | 70 | 24 | 5 | | | | | | 1 | F |
| 30 | 4 | | 70 | 23 | 5 | | | | | | 2 | F |
| 31 | 4 | | 69 | 24 | 5 | | | | | | 2 | F |
| 32 | 4 | | 69 | 23 | 5 | | | | | | 3 | F |

-continued

Release Layer Solutions

| | | | | | | | | |
|---|---|---|---|---|---|---|---|---|
| 33 | 4 | | 68 | 23 | 5 | 2 | 2 | F |
| 34 | 4 | | 69 | 24 | 5 | 1 | 1 | F |
| 35 | 6 | | 70 | 23 | 5 | 1 | 1 | A |
| 36 | 7 | | 71 | 22 | 5 | 1 | 1 | G |
| 37 | 7 | | 74 | 24 | | 1 | 1 | G |
| 38 | 7 | | 73 | 25 | | 1 | 1 | G |
| 39 | 7 | | 75 | 23 | | 1 | 1 | G |
| 40 | 7 | | 74 | 25 | | | 1 | G |
| 41 | 7 | | 75 | 24 | | 1 | | G |
| 42 | 7 | | 74 | 24 | | 2 | | G |
| 43 | 7 | 11 | 75 | 25 | | | | A |
| 44 | 7 | 12 | 75 | 25 | | | | A |
| 45 | 7 | | 3 | 2 | | 95 | | A |

| Formula # | Barrier Solution | Image Solution | M. Prime 4983R | M. Emulsion 73635M | Micro-thene FE 532 | PVOH 10% | Monsanto Scriptset | Poly-styrene | Hercobond 2000 | Kymene 736 | Dow Latex CP615NA | Dymsol 400 | Results |
|---|---|---|---|---|---|---|---|---|---|---|---|---|---|
| 46 | 7 | | 67 | 22 | | 11 | | | | | | | A |
| 47 | 7 | | 67 | 22 | | | | 11 | | | | | A |
| 48 | 7 | | 71 | 24 | | | 5 | | | | | | A |
| 49 | 7 | | 73 | 24 | | | 3 | | | | | | A |
| 50 | 7 | | 74 | 25 | | | | | 1 | | | | G |
| 51 | 7 | | 74 | 24 | | | | | 1 | 1 | | | G |
| 52 | 7 | | 75 | 24 | | | | | 1 | | | | G |
| 53 | 7 | | 74 | 25 | | 1 | | | | | | | F |
| 54 | 7 | | 74 | 24 | | 2 | | | | | | | F |
| 55 | 7 | | 71 | 24 | | 5 | | | | | | | F |
| 56 | 7 | | 68 | 23 | | 9 | | | | | | | F |
| 57 | 8 | 1 | 75 | 25 | | | | | | | | | A |
| 58 | 8 | 2 | 75 | 25 | | | | | | | | | A |
| 59 | 8 | | 71 | 23 | 2 | 2 | | | 2 | | | | G |
| 60 | 8 | | 68 | 23 | 5 | 2 | | | 2 | | | | F |
| 61 | 8 | | 64 | 22 | 10 | 2 | | | 2 | | | | F |
| 62 | 9 | | 70 | 24 | 2 | 2 | | | 2 | | | | A |
| 63 | 10 | | 70 | 24 | 2 | 2 | | | 2 | | | | G |
| 64 | 10 | | 69 | 23 | 4 | 2 | | | 2 | | | | G |
| 65 | 10 | | 67 | 22 | 7 | 2 | | | 2 | | | | G |
| 66 | 10 | | 68 | 23 | 7 | 2 | | | | | | | G |
| 67 | 10 | 3 | 71 | 24 | 5 | | | | | | | | F |
| 68 | 10 | 3 | 67 | 22 | 1 | | | | | | | | F |
| 69 | 10 | 3 | 60 | 30 | 10 | | | | | | | | G |
| 70 | 10 | 10 | 60 | 30 | 10 | | | | | | | | A |
| 71 | 10 | | 59 | 29 | 10 | 2 | | | | | | | F |
| 72 | 10 | | 56 | 28 | 15 | 1 | | | | | | | G |
| 73 | 10 | | 52 | 26 | 20 | 2 | | | | | | | G |
| 74 | 10 | | 59 | 29 | 10 | 2 | | | | | | | G |
| 75 | 12 | | 59 | 29 | 10 | 2 | | | | | | | F |
| 76 | 10 | | | 29 | 10 | 2 | | | | | 59 | | F |
| 77 | 10 | | | 43 | 11 | 3 | | | | | 43 | | F |
| 78 | 10 | | 58 | 29 | 10 | 2 | | | | | 1 | | G |
| 79 | 10 | | 58 | 29 | 10 | 1 | | | | | 1 | 1 | A |
| 80 | 10 | | 49 | 29 | 10 | 1 | | | | | 10 | 1 | A |
| 81 | 10 | | 81 | | 14 | 3 | | | | | 1 | 1 | F |
| 82 | 10 | | 81 | | 14 | 3 | | | | | 2 | | F |
| 83 | 10 | | 100 | | | | | | | | | | F |
| 84 | 10 | | 98 | | | | | | | | 2 | | F |
| 85 | 10 | 4 | | | 5 | | | | | | 54 | | F |

| Formula # | Barrier Sol. | Image Sol. | M. Prime 4983R | D. Latex 615NA | Dym-sol 400 | Hystr. V-43 | Hystr. V-29 | Acrysol WS-50 | Carbo-bond 26387 | Hycar 26796 | Dym-sol M-40 | Hycar 26120 | Dao-tan VTW 1265 | Tri-ton X-114 | Tri ton X-100 | Carbo-wax PEG 400 | Re-sults |
|---|---|---|---|---|---|---|---|---|---|---|---|---|---|---|---|---|---|
| 86 | 10 | | 50 | | | 50 | | | | | | | | | | | A |
| 87 | 10 | | 80 | | | 20 | | | | | | | | | | | F |
| 88 | 10 | | 97 | | 3 | | | | | | | | | | | | G |
| 89 | 10 | | 78 | | 2 | 20 | | | | | | | | | | | F |
| 90 | 10 | | 91 | | 4 | 5 | | | | | | | | | | | G |
| 91 | 10 | | 88 | 3 | 4 | 5 | | | | | | | | | | | G |
| 92 | 10 | | 84 | 6 | 4 | 6 | | | | | | | | | | | F |
| 93 | 10 | | 85 | | 3 | | 12 | | | | | | | | | | F |
| 94 | 10 | | | 84 | 4 | | 12 | | | | | | | | | | F |
| 95 | 10 | | | | 4 | | 12 | 84 | | | | | | | | | A |
| 96 | 10 | | 75 | | 4 | | 21 | | | | | | | | | | G |
| 97 | 10 | | 91 | | 4 | | 5 | | | | | | | | | | G |
| 98 | 10 | | | | 4 | | 5 | | 91 | | | | | | | | A |

-continued

| Release Layer Solutions | | | | | | | | | | | | | |
|---|---|---|---|---|---|---|---|---|---|---|---|---|---|
| 99 | 10 | | | 4 | 5 | 91 | | | | | | | A |
| 100 | 10 | | 91 | 4 | 5 | | | | | | | | G |
| 101 | 10 | | 89 | 4 | 5 | | 2 | | | | | | G |
| 102 | 10 | | 45 | 5 | 5 | | | 45 | | | | | A |
| 103 | 10 | 5 | 89 | 4 | 5 | | 2 | | | | | | G |
| 104 | 10 | 5 | 86 | 4 | 5 | | 5 | | | | | | G |
| 105 | 10 | 5 | 86 | 4 | 5 | | 5 | | | | | | G |
| 106 | 10 | 5 | 87 | 4 | 5 | | | | 4 | | | | E |
| 107 | 11 | 5 | 87 | | 5 | | | | 4 | | | 4 | E |
| 108 | 11 | 9 | 86 | | 5 | | | | 4 | | 1 | 4 | E |
| 109 | 11 | 9 | 86 | 4 | 5 | | | | 4 | | 1 | | E |
| 110 | 11 | 7 | 85 | | 5 | | | | 4 | 2 | | 4 | E |
| 111 | 11 | 8 | 82 | | 5 | | | | 4 | 5 | | 4 | E |
| 112 | 11 | 6 | 86 | | 5 | | | | 4 | 1 | | 4 | E |

EXAMPLE 7

Transfer sheets are prepared in accordance with VI(E) in Table VI of U.S. Pat. No. 5,798,179 to Kronzer, and transfer sheets are prepared according to Example 1 of the present Specification. All transfer sheets are imaged using a laser copier. After 2 Kronzer transfer sheets are imaged, the wax present in the transfer material melts due to the heat of the drums of the copier. The melted wax will gum up and damage the laser copier. After 10 inventive transfer sheets are imaged, there is no damage to the copier because there is no wax present or wax is present in amounts sufficient low as to not adversely affect laser copying or damage the laser copier.

EXAMPLE 8

A transfer sheet of the present invention is compared with a transfer material of U.S. Pat. No. 5,798,179 to Kronzer. Both formulations comprise a substrate coated with a Barrier Layer and overcoated with a heat-activated Release Layer. The substrate is imaged upon and transferred to a receptor with the application of heat and pressure.

The transfer sheet of the present invention and the transfer sheet of U.S. '179 are prepared using a barrier layer solution of 100 parts Reichold Synthemul solution (available from Reichhold Chemicals, Inc., Research Triangle Park, N.C.).

The release layer solution of the present invention for this Example comprises Michelman Michem Prime 4983R (86 Parts), BF Goodrich Hystretch V-29 (5 parts), Union Carbide Carbowax PG 400 (4 parts), Vianova Daotan VTW 1265 (4 parts) and Triton X-100 (1 part) with a 3.0 mil (wet) coat thickness.

The release layer solution for the transfer material of U.S. Pat. No. 5,798,179 to Kronzer is 100 parts Michelman Michem Prime 4983R with a 3.0 mil (wet) coat thickness.

Two sheets of standard ink jet printer paper are coated (3.0 mil (wet) coat thickness) with the above Barrier Layer solution and forced air dried for one minute. After drying, one sheet is coated with the above-described U.S. '179 release layer solution (3.0 mil (wet) coat thickness) and the other sheet is coated with the above-described present invention release layer solution. The sheets are again force air dried for one minute.

The dried sheets are imaged upon using a color laser printer. The obtained images are transferred onto a 100% cotton receptor in accordance with Example 3 using a hand iron at 190° C. for 3 minutes. The images are allowed to cool for 2 minutes. Once cool, the transfer sheets are peeled away from the receptor (i.e., a cotton tee shirt). The receptor is washed five times on normal cycle with Tide® brand detergent (cold wash, cold rinse). The receptor is dried after each wash cycle on low heat for 30 minutes. The results from such a comparison are described below.

| Sheet | Color Saturation | Image Detail | Image Cracking | Fabric Adherence |
|---|---|---|---|---|
| U.S. '179 | good | very good | minimal | very good |
| Inventive | excellent | Excellent | minimal-none | excellent |

The image transferred in accordance with the present invention is unexpectedly superior in color saturation, image detail, image cracking, and fabric adherence. The present invention is also unexpectedly superior with respect to resistance to damage during repeated machine washings.

EXAMPLE 9

A transfer sheet of the present invention is coated with a silver halide emulsion.

Silver halide grains as described in Example 1 of U.S. Patent Application No. 60/056,446 are prepared by mixing a solution of 0.3 M silver nitrate with a solution of 0.4 M sodium chloride.

Thus, in this example, the silver halide grains are coated on top of the present transfer material in the same manner as in conventional photographic systems.

The sensitized paper is exposed and processed in the same manner as described in U.S. Patent Application No. 60/056,446. That is, the sensitized paper is exposed to room light for about 30 seconds and then developed in color treatment chemistry known in the art as RA-4 (Eastman Kodak). The working solution RA-4 is a paper development color process. The coupler magenta, cyan or yellow color coupling dye is added to the RA-4 working solution before development. Therefore, it is similar to the color development process known as the K-14 Kodachrome process (Eastman Kodak). The test sample is a sample of what a magenta layer (red-blue hue) would look like if separated. The resulting uniform image contains both the silver and color coupler dyes. Both the material and dye image can withstand bleaching to remove silver, thereby leaving only the color image. The material is then dried.

The resulting photographic image is transferred as in Example 3, above.

EXAMPLE 10

Example 9 is repeated, except that the silver halide grains are dispersed in the Release Layer of the present invention in the same manner as described in U.S. Patent Application No. 60/029,917 where the silver halide grains are dispersed in the transfer layer.

EXAMPLE 11

A layer of photosensitive microcapsules as described in U.S. Pat. No. 4,904,645 is coated onto the transfer material of the present invention in the manner described in Example 1 of U.S. Patent Application No. 60/065,806. Then, the coated sheet is then image-wise exposed through a mask for 5.2 seconds using a fluorescent light source. The exposed transfer sheet is processed at high temperatures with a calendaring roll as described in Example 1 of U.S. Pat. No. 4,751,165. After exposure the transfer sheet is then applied to a substrate in the manner described in Example 3, above.

EXAMPLE 12

Example 11 is repeated, except the microcapsules are dispersed in the Release Layer of the present invention in the same manner as the microcapsules are dispersed in the transfer layer as shown in Example 1 of U.S. Patent Application No. 60/030,933. That is, photosensitive microcapsules are prepared in the manner described in U.S. Pat. No. 4,904,645 and are dispersed in the Release Layer of the present invention. The transfer sheet is then prepared in the manner described in Example 1 of the present invention. Then, the coated sheet is then image-wise exposed through a mask for 5.2 seconds using a fluorescent light source. The exposed sheet is processed at high temperatures with a calendaring roll as described in Example 1 of U.S. Pat. No. 4,751,165. After exposure the transfer sheet is then applied to a substrate in the manner described in Example 3, above.

EXAMPLE 13

The light-fixable thermal recording layer according to Example 2 of U.S. Pat. No. 4,771,032 is coated onto the transfer material of the present invention in the same manner as in Example 1 of U.S. Patent Application No. 60/065,894, where a light-fixable thermal recording layer according to Example 2 of U.S. Pat. No. 4,771,032 is coated onto the transfer layer. The obtained recording material is then subjected to the procedure described in U.S. Pat. No. 5,486,446 as follows.

Applied power to thermal head and pulse duration are set so that the recording energy per area is 35 $mJ/mm^2$. The writing of the heat-sensitive recording material is conducted using a thermal head (KST type, a product of Kyocera K.K.).

Subsequently, the recording material is exposed to an ultraviolet lamp (light emitting central wavelength: 420 nm; output 40 W) for 10 seconds. Applied power to the thermal head and pulse duration are again set so that the recording energy per unit area is 62 $mJ/mm^2$, and writing of the heat-sensitive recording material is conducted under these applied energies.

Furthermore, the recording material is exposed to an ultraviolet lamp (light emitting central wavelength: 365 nm; output: 40 W) for 15 seconds. Applied power to the thermal head and pulse duration are again set so that the recording energy per unit is 86 $mJ/mm^2$, and writing of the heat-sensitive recording material is conducted under these conditions. The coated transfer sheet is prepared, exposed, and developed according to U.S. Patent Application No. 60/065,804.

EXAMPLE 14

Example 13 is repeated, except that the microcapsule-containing direct thermal recording imaging element is dispersed in the release layer in the same manner as the microcapsules are dispersed in the transfer material as shown in U.S. Patent Application No. 60/030,933. That is, the microcapsules are blended together with Release Layer Formulation 1 of the present invention. The transfer sheet is then exposed as demonstrated in Example 13, above. The exposed transfer sheet is then transferred as demonstrated in Example 3, above.

EXAMPLE 15

Example 1 is repeated, except that once the image layer has completely dried, the following antistatic layer is coated on the backside of the substrate (the previously non-coated side).

| Antistatic Layer Solution Formulation 1 | |
|---|---|
| Water | 90 parts |
| Quaternary ammonium salt solution (Statik-Blok J-2, Amstat Industries) | 10 parts |

The antistatic solution is applied in a long line across the top edge of the substrate using a #4 metering rod. The coated substrate is force air dried for approximately one minute.

The antistatic solution of this Example has the following characteristics: the solution viscosity as measured on a Brookfield DV-I+ viscometer, LV1 spindle @ 60 RPM is 2.0 (cP) at 24.5° C. The coating weights (wet) are 10 to 20 $g/m^2$. The surface tension is 69.5 dynes/cm at 24° C.

Once the substrate and antistatic coating are dry, the coated transfer sheet is placed into an electrostatic printer and imaged upon.

EXAMPLE 16

Example 15 is repeated, except that following formulation is used as the antistatic layer and is coated on the backside of the substrate (the previously non-coated side):

| Antistatic Layer Solution Formulation 2 | |
|---|---|
| Water | 90 parts |
| Polyether (Marklear ALF-23, Witco Ind.) | 5 parts. |

EXAMPLE 17

A transfer sheet of the present invention is prepared as follows:

Barrier Layer Formulation 1 is coated onto a substrate of the present invention as shown in Example 1.

Once the barrier layer has completely dried, the release layer solution is coated directly on top of the barrier layer. For this Example, the release layer is the third layer of U.S. Pat. No. 5,798,179 to Kronzer. The release layer solution is applied in a long line across the top edge of the paper and barrier layer. Using a #30 metering rod, the bead of solution is spread evenly across the substrate. The coated paper is force air dried for approximately two minutes.

Once the release layer has completely dried, the (optional) image receiving layer solution is coated directly on top of the release layer. For the purposes of this Example, the image receiving layer is Image Receiving Layer 1. Accordingly, the image receiving layer comprises ethylene acrylic acid. The image receiving layer solution is applied in a long line across the top edge of the release layer. Using a #30 metering rod, the bead of solution is spread evenly across the substrate. The coated substrate is force air dried for approximately two minutes. Once the substrate is dry, it is placed into a laser printer or copier and imaged upon. The following table can be used as a guide to determine optimum coating weights and thickness of each layer.

EXAMPLE 18

This Example demonstrates different solution viscosities, wet coating weights, and surface tension for preferred formulations Release Layer Formulation 1, Barrier Layer Formulation 1, and Image Layer Formulation 1.

| | Solution Viscositites* | |
|---|---|---|
| Solution | Viscosity (cP) | Temperature (° C.) |
| Barrier Layer | 100 | 27.8 |
| Release Layer | 125 | 28.9 |
| Image Layer | 150 | 27.8 |
| Antistatic Layer | 2.0 | 24.5 |

*Viscositites measured on a Brookfield DV-I + viscometer, LV2 spindle @ 60 RPM

| | Coating Weights (wet) | |
|---|---|---|
| Solution | $g/ft^2$ | $g/m^2$ |
| Barrier Layer | 2.53 | 27.22 |
| Release Layer | 9.41 | 101.23 |
| Image Layer | 1.58 | 17.00 |
| Antistatic Layer | 1.67 | 18.00 |

| | Surface Tension of Each Solution | |
|---|---|---|
| | Surface Tension (dynes/cm) | Temperature (° C.) |
| Barrier Layer Solution | 43.5 | 24 |
| Release Layer Solution | 46.2 | 24 |
| Image Layer Solution | 50.5 | 24 |
| Antistatic Layer Solution | 69.5 | 24 |

All cited patents, publications, copending applications, and provisional applications referred to in this application are herein incorporated by reference.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A polymeric composition comprising an acrylic dispersion, an elastomeric emulsion, a water repellant and a plasticizer.

2. The polymeric composition of claim 1, wherein said acrylic dispersion is an ethylene acrylic acid dispersion, said water repellant is a polyurethane dispersion and said plasticizer is a polyethylene glycol.

3. The polymeric composition of claim 2, wherein said ethylene acrylic acid dispersion comprises ethylene acrylic that melts in the range of from about 65° C. to about 180° C.

4. The polymeric composition of claim 1, wherein said elastomeric emulsion comprises an elastomer having a Tg in the range of from −50° C. to 25° C.

5. The polymeric composition of claim 1, wherein said polyurethane dispersion comprises a polyurethane having a Tg in the range of from −50° C. to 25° C.

6. The polymeric composition of claim 2, wherein said ethylene acrylic acid dispersion is present in an amount of from 46 to 90 parts by weight; said elastomeric emulsion is present in an amount of from 1 to 45 parts by weight; said polyurethane dispersion is present in an amount of from 1 to 7 parts by weight; and said polyethylene glycol is present in an amount of from 1 to 8 parts by weight.

7. The polymeric composition of claim 2, wherein said ethylene acrylic acid dispersion is present in an amount of 86 parts by weight; said elastomeric emulsion is present in an amount of 5 parts by weight; said polyurethane dispersion is present in an amount of 4 parts by weight; and said polyethylene glycol is present in an amount of 4 parts by weight.

8. The polymeric composition of claim 2, which further comprises a polyethylene glycol mono ((tetramethyl butyl) phenol) ester compound.

9. The polymeric composition of claim 2, wherein the elastomeric emulsion is selected from the group consisting of polybutadienes, polyurethanes, styrene-butadiene polymers, styrene-butadiene-styrene polymers, acrylonitrile-butadiene polymers, acrylonitrile-butadiene-styrene polymers, acrylonitrile-ethylene-styrene polymers, polyacrylates, polychloroprene, ethylene-vinyl acetate polymers, and poly(vinyl chloride).

10. A polymeric composition comprising a film forming binder, an elastomeric emulsion, a water repellant and a plasticizer, wherein said film forming binder is at least one selected from the group consisting of polyacrylates, polyacrylic acid, polymethacrylates, polyvinyl acetates, co-polymer blends of vinyl acetate and ethylene/acrylic acid co-polymers, ethylene-acrylic acid copolymers, polyolefins, and natural and synthetic waxes.

11. The polymeric composition according to claim 10, wherein said film forming binder is at least one selected from the group consisting of polyester, polyolefin and polyamide.

12. The polymeric composition according to claim 10, wherein said film forming binder is at least one selected from the group consisting of polyacrylates, polyacrylic acid, polymethacrylates, polyvinyl acetates co-polymer blends of vinyl acetate and ethylene/acrylic acid co-polymers, ethylene-acrylic acid copolymers, polyolefins, and natural and synthetic waxes.

13. The polymeric composition of claim 12, wherein the natural and synthetic waxes are selected from the group consisting of carnauba wax, mineral waxes, montan waxes, petroleum waxes, polyethylene waxes and oxidized polyethylene waxes.

14. A polymeric composition comprising: a film forming binder, an elastomeric emulsion, a water repellant and a plasticizer, wherein the elastomeric emulsion is selected from the group consisting of polybutadienes, polyurethanes, styrene-butadiene polymers, styrene-butadiene-styrene polymers, acrylonitrile-butadiene-styrene polymers, acrylonitrile-ethylene-styrene polymers, polyacrylates, polychloroprene, ethylene-vinyl acetate polymers, and poly (vinyl chloride).

15. The polymeric composition according to claim 1, wherein said acrylic dispersion is present in an amount of from 46 to 90 weight % based on the total weight of the composition.

16. The polymeric composition according to claim 15, wherein said acrylic dispersion is present in an amount of from 70 to 90 weight % based on the total weight of the composition.

17. The polymeric composition according to claim 1, wherein said elastomeric emulsion is present in an amount of from 1 to 45 weight % based on the total weight of the composition.

18. The polymeric composition according to claim 17, wherein said elastomeric emulsion is present in an amount of from 1 to 20 weight % based on the total weight of the composition.

19. The polymeric composition according to claim 1, wherein said water repellant is present in an amount of from 0.5 to 7 weight % based on the total weight of the composition.

20. The polymeric composition according to claim 19, wherein said water repellant is present in an amount of from 3 to 6 weight % based on the total weight of the composition.

21. The polymeric composition according to claim 1, wherein said plasticizer is present in an amount of from 1 to 8 weight % based on the total weight of the composition.

22. The polymeric composition according to claim 21, wherein said plasticizer is present in an amount of from 2 to 7 weight % based on the total weight of the composition.

* * * * *